United States Patent
Ng et al.

(10) Patent No.: US 11,767,651 B2
(45) Date of Patent: Sep. 26, 2023

(54) SYSTEMS AND DEVICES FOR WASTE COLLECTION AND STORAGE

(71) Applicant: NGspiraGold Enterprises Company Limited, Hong Kong (CN)

(72) Inventors: Tze Chuen Ng, Hong Kong (CN); Hok Kai Samuel Choi, Hong Kong (CN); To Wai Li, Hong Kong (CN)

(73) Assignee: NGspiraGold Enterprises Company Limited, Hong Kong (CN)

( * ) Notice: Subject to any disclaimer, the term of this patent is extended or adjusted under 35 U.S.C. 154(b) by 264 days.

(21) Appl. No.: 17/302,589

(22) Filed: May 7, 2021

(65) Prior Publication Data

US 2022/0356662 A1     Nov. 10, 2022

(51) Int. Cl.
*E01H 1/12* (2006.01)
*A01K 23/00* (2006.01)

(52) U.S. Cl.
CPC ......... *E01H 1/1206* (2013.01); *A01K 23/005* (2013.01); *E01H 2001/128* (2013.01); *E01H 2001/1293* (2013.01)

(58) Field of Classification Search
CPC ............ E01H 1/1206; E01H 2001/128; E01H 1/1286; E01H 1/1293; A01K 23/005
(Continued)

(56) References Cited

U.S. PATENT DOCUMENTS 3,718,358 A * 2/1973 Ayers ............... A47L 13/52
                                                    294/1.4
3,733,098 A * 5/1973 Tobias .............. B65D 5/10
                                                    294/1.4
(Continued)

FOREIGN PATENT DOCUMENTS

CN  109312549 A   2/2019
CN  209211372 U   8/2019
(Continued)

OTHER PUBLICATIONS

"2 in 1 Dog Poop Scooper Bag Holder", Life Changing Products [online] [retrieved on May 10, 2021] retrieved from Internet <URL: https://lcpshop.net/product/2in1-dog-poop-scooper-bag-holder/>.
(Continued)

*Primary Examiner* — Paul T Chin
(74) *Attorney, Agent, or Firm* — EAGLE IP LIMITED

(57) ABSTRACT

One example embodiment is a waste collection and storage device, comprising: (a) a disposable container with a body and a base; (b) a plurality of panels extended from the base, each of the panels has a panel distal end extending away from the body, the panel distal ends of the panels pointing inwardly and defining an opening therebetween in an open state; and (c) at least one locking mechanism disposed on at least one of the panels. When a force is applied on the body to the panel distal ends against a target surface having a waste, the panel distal ends move inwards towards each other and in turn close up the opening to form a closed state, and the body and the panels together create a cavity, such that the waste can be scooped up from the target surface and accommodated within the cavity. The locking mechanism locks the panels in the closed state to store the waste within the cavity. Other example embodiments are described herein. In certain embodiments, the waste collection and storage device is simple in structure and cost-efficient in manufacturing.

16 Claims, 15 Drawing Sheets

(58) Field of Classification Search
USPC .......................................................... 294/1.4
See application file for complete search history.

(56) References Cited

U.S. PATENT DOCUMENTS

| | | | | |
|---|---|---|---|---|
| 3,823,970 | A | * | 7/1974 | Brenner ................ E01H 1/1206 |
| | | | | 294/1.4 |
| 4,014,584 | A | * | 3/1977 | Bau ...................... E01H 1/1206 |
| | | | | 294/1.4 |
| 4,148,510 | A | | 4/1979 | Brack |
| 4,958,871 | A | * | 9/1990 | Hemans ................ E01H 1/1206 |
| | | | | 15/257.1 |
| 5,056,842 | A | * | 10/1991 | Lindenberg ........... E01H 1/1206 |
| | | | | 294/1.4 |
| 5,203,598 | A | * | 4/1993 | Lindlbauer ........... E01H 1/1206 |
| | | | | 294/1.4 |
| 5,326,143 | A | * | 7/1994 | Babler .................. E01H 1/1206 |
| | | | | 294/1.4 |
| 5,634,678 | A | * | 6/1997 | Bailey .................. A01K 23/005 |
| | | | | 294/1.5 |
| 6,305,322 | B1 | | 10/2001 | Patel |
| D461,027 | S | * | 7/2002 | Gardner ....................... D30/162 |
| 9,004,555 | B1 | * | 4/2015 | Chirico ................ E01H 1/1206 |
| | | | | 224/660 |
| 10,392,760 | B1 | | 8/2019 | Luk |
| 10,577,765 | B2 | * | 3/2020 | Fulbrook .............. E01H 1/1206 |
| 2008/0303296 | A1 | | 12/2008 | Waltz |
| 2015/0240434 | A1 | | 8/2015 | Kaufman |
| 2017/0275838 | A1 | * | 9/2017 | Giallourakis ........ A01K 23/005 |

FOREIGN PATENT DOCUMENTS

| | | |
|---|---|---|
| CN | 215302299 U | 12/2021 |
| WO | 2006072621 A2 | 7/2006 |

OTHER PUBLICATIONS

Heßling, M., (2020). Ultraviolet irradiation doses for coronavirus inactivation—review and analysis of coronavirus photoinactivation studies. GMS hygiene and infection control, 15, Doc08.

* cited by examiner

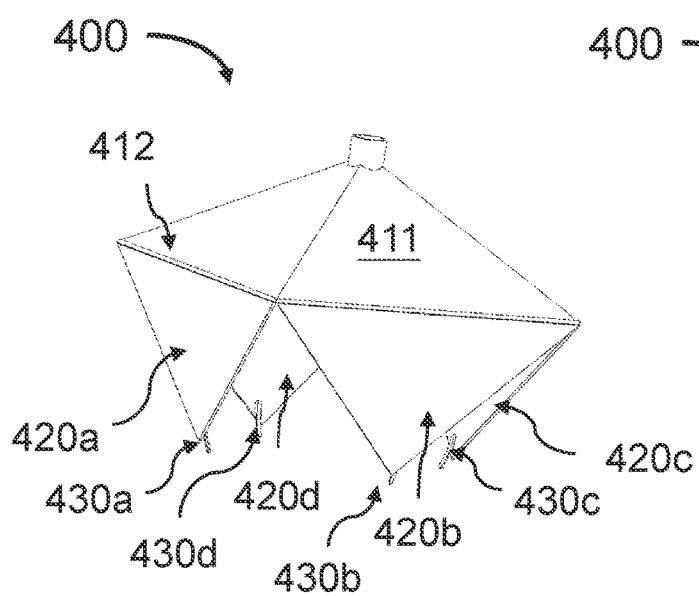
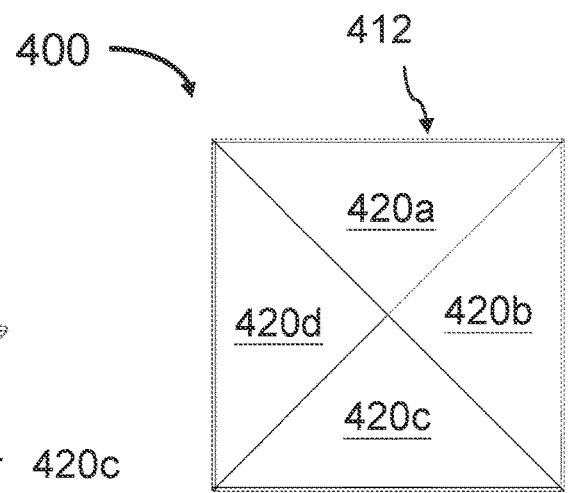
Fig.4A  Fig.4B
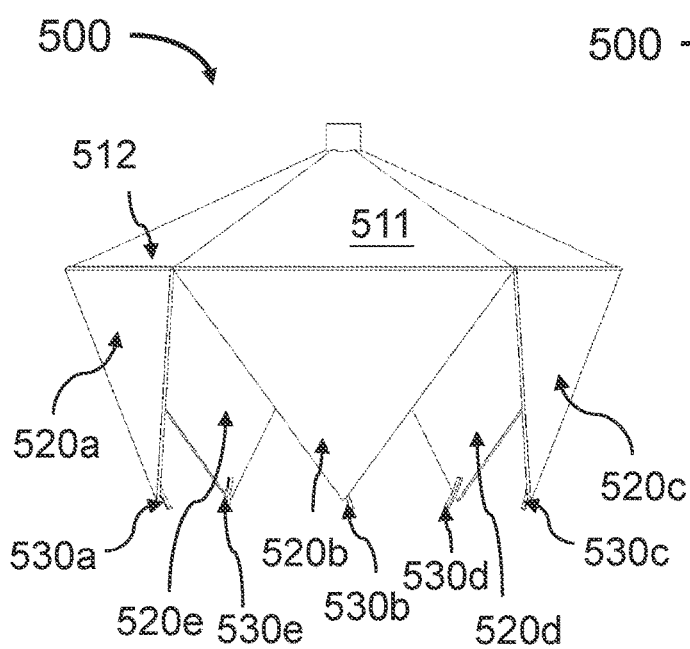
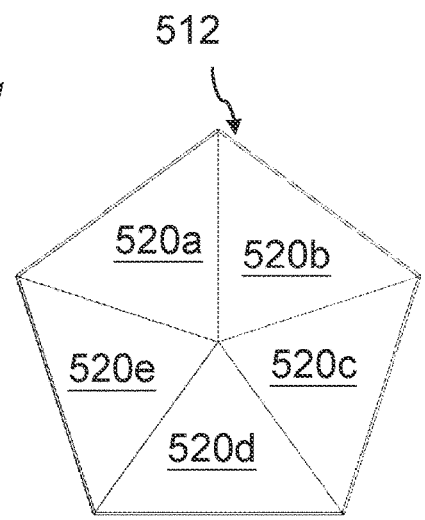
Fig.5A  Fig.5B

SYSTEMS AND DEVICES FOR WASTE COLLECTION AND STORAGE

FIELD OF INVENTION

This invention relates to systems and devices for waste collection and storage, and in particular systems and devices for collection and storage of animal droppings.

BACKGROUND OF INVENTION

Wastes such as animal droppings potentially have various types of toxins or pathogens that pose danger to public health. Collection and handling of animal droppings, is often a tedious and challenging task. Conventional methods for collecting animal droppings may include steps of placing pieces of paper or plastic bags underneath an animal such as a pet, then wrapping and throwing the droppings into garbage cans with users' hands. This is both unhygienic and inconvenient. Certain devices for collecting animal droppings are available, but they are often hard to operate, expensive and complicated in their designs.

SUMMARY OF INVENTION

In the light of the foregoing background, in certain embodiments, it is an object to provide improved devices and systems for collecting and storing waste, such as animal droppings.

Accordingly, an exemplary embodiment of the present disclosure is a waste collection and storage device, comprising: (a) a disposable container with a body and a base; (b) a plurality of panels extended from the base, each of the panels has a panel distal end extending away from the body, the panel distal ends of the panels pointing inwardly and defining an opening therebetween in an open state; and (c) at least one locking mechanism disposed on at least one of the panels. When a force is applied on the body to the panel distal ends against a target surface having a waste, the panel distal ends move inwards towards each other and in turn close up the opening to form a closed state, and the body and the panels together create a cavity, such that the waste can be scooped up from the target surface and accommodated within the cavity. The locking mechanism locks the panels in the closed state to store the waste within the cavity.

According to another exemplary embodiment, provided is a system for collecting and storing waste, comprising: (a) a disposable container comprising: (i) a body and a base; (ii) a plurality of panels extended from the base, each of the panels has a panel distal end extending away from the body, the panel distal ends of the panels pointing inwardly and defining an opening therebetween in an open state; (iii) at least one locking mechanism disposed on at least one of the panels; and (iv) a handle connector; and (b) a handle having a handle distal end configured to reversibly engage the handle connector to connect the handle and the disposable container. The handle and the disposable container is connected during use, and when a force is applied on the body to the panel distal ends against a target surface having a waste, the panel distal ends move inwards towards each other and in turn close up the opening to form a closed state, and the body and the panels together create a cavity, such that the waste can be scooped up from the target surface and accommodated within the cavity. The locking mechanism locks the panels in the closed state to store the waste within the cavity.

Other example embodiments are discussed herein.

There are various advantages in the various embodiments. For instance, some embodiments provide novel systems and devices for handling of the waste that is simple in structure and is cheaper to manufacture. In some embodiments, the novel systems and devices are convenient to operate, providing a better user experience. In some embodiments, the novel systems and devices can avoid the need for handling the waste directly by users' hands, minimizing the potential health risk to users. Some embodiments provide novel systems and devices that are capable of scooping up, collecting and storing the waste, making it convenient for the users to carry and store the waste within the device until a designated waste collection site is available. In some embodiments, the locking mechanism of the novel systems and devices ensure the animal droppings are locked within the container.

In some embodiments, the disposable container of the device is disposable after use while the handle is reusable for a long period of time, thereby offering a less expensive and environmental friendlier solution for handling of waste. In some embodiments, the disposable container can be reversibly connected to an animal wearable (e.g. a pet collar) by the adaptor such that it can be carried along by a pet animal instead of the user. In certain embodiments, the design of the disposable containers allows many light-weight and environmentally friendlier materials, such as recyclable paper, to be used.

BRIEF DESCRIPTION OF FIGURES

FIG. 4A is an isometric view of a waste collection and storage device with a square base and four panels in an open state according to another example embodiment.

FIG. 4B is a bottom view of the waste collection and storage device of the same example embodiment as shown in FIG. 4A when the panels are in a closed state.

FIG. 5A is an isometric view of a waste collection and storage device with a pentagon base and five panels in an open state according to another example embodiment.

FIG. 5B is a bottom view of the waste collection and storage device of the same example embodiment as shown in FIG. 5A when the panels are in a closed state.

DETAILED DESCRIPTION

Figure 1A:
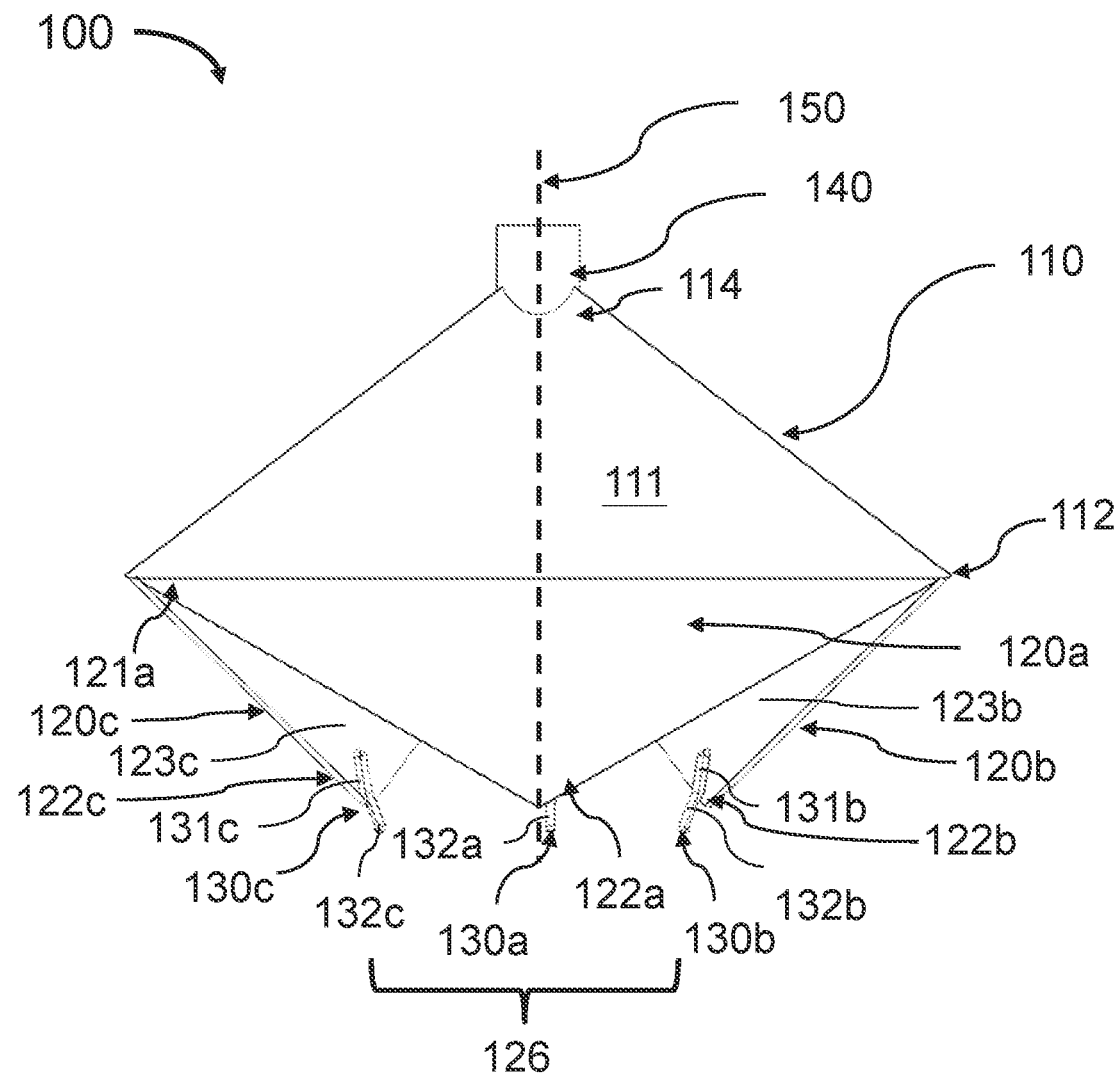
FIG. 1A and FIG. 1B show a side view and a perspective view of a waste collection and storage device respectively, according to an example embodiment.

As used herein and in the claims, "comprising" means including the following elements but not excluding others.

As used herein and in the claims, the terms "general" or "generally", or "substantial" or "substantially" mean that the recited characteristic, angle, shape, state, structure, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, an object that has a "generally" equilateral triangle shape would mean that the object has either an exact equilateral triangle shape or a nearly exact equilateral triangle shape. In another example, an object that is "substantially" perpendicular to a surface would mean that the object is either exactly perpendicular to the surface or nearly exactly perpendicular to the surface, e.g., has a 5% deviation.

As used herein and in the claims, the term "open state" refers to a state of the panels in which the panels extend downwardly away from the base and slanting inwards at an angle, defining an opening therebetween.

As used herein and in the claims, "inwards" or "inwardly" refers to a direction towards a central axis of an object. In some example embodiments, "inward" or "inwardly" refers to a direction towards a central axis of a container.

As used herein and in the claims, "connected" or "attached" refer to direct or indirect physical joining one component to another.

As used herein and in the claims, "waste" refers to any object(s) that is intended to be disposed. In some embodiments, "waste" particularly refers to waste from animals, e.g., animal droppings, such as dog poo. In some embodiments, the animal droppings are droppings from pet animals such as dogs and cats etc.

As used herein and in the claims, "edge" refers to a boundary of a closed curve. In certain embodiments, the edge of a base refers to the physical boundary that forms the perimeter or circumference of the base.

For the sake of clarity, when one part "mates" or "engages" with another part, the two parts connect in such a way as to secure a position.

It shall be understood by one of skill in the art that structures such as notches, slots, ribs, and protrusions can come in a variety of shapes and sizes. For example, a rib can protrude out and a notch can indent inwards, but the opposite could also be true. As long as the two parts are adapted such that they can mate with each other, they are included within the scope of this invention.

It is to be understood that terms such as "top", "bottom", "middle", "side", "length", "inner", "outer", "interior", "exterior," and the like as may be used herein, merely describe points of reference and do not limit the present invention to any particular orientation or configuration. Further, terms such as "first," "second," "third," etc., merely identify one of a number of portions, components and/or points of reference as disclosed herein, and likewise do not limit the present invention to any particular configuration or orientation.

In some embodiments, provided is a waste collection and storage device, comprising: (a) a disposable container with a body and a base; (b) a plurality of panels extended from the base, each of the panels has a panel distal end extending away from the body, the panel distal ends of the panels pointing inwardly and defining an opening therebetween in an open state; and (c) at least one locking mechanism disposed on at least one of the panels. When a force is applied on the body to the panel distal ends against a target surface having a waste, the panel distal ends move inwards towards each other and in turn close up the opening to form a closed state, and the body and the panels together create a cavity, such that the waste can be scooped up from the target surface and accommodated within the cavity. The locking mechanism locks the panels in the closed state to store the waste within the cavity.

In some embodiments, the locking mechanism comprises a plurality of interlocking pins, wherein each interlocking pin comprises an attachment portion disposed on at least one of the panels and a locking portion adapted to interact with another interlocking pin of at least one adjacent panel, such that when the panels are in the closed state, the interlocking pins irreversibly interlock with each other to prevent the panels from opening.

In some embodiments, the attachment portion is attached to the panel distal end of at least one of the panels, and the locking portion extends away from the panel distal end and bends inwardly when the panels are in the open state.

In some embodiments, the base further comprises a rim and at least one slot disposed on the rim, and wherein each panel comprises a panel inner surface for engaging with the rim and the locking mechanism further comprises at least one rib projecting from the panel inner surface with a shape complementary to the at least one slot, such that when the panels are in the closed state, the mating of the at least one slot and the at least one rib secures the engagement of each panel with the rim.

In some embodiments, the body has a generally frusto-pyramidal shape and the base has a generally equilateral triangle shape with three base edges, and the device comprises three panels, each panel having a general shape of a triangle with a side attached to and aligned along one of the three base edges, wherein when the panels are in the closed state, the panels abut each other to form a substantially contiguous surface sufficient to cover the base.

In some embodiments, the waste collection and storage device further includes a handle having a handle distal end and an engagement component disposed on the handle distal end, and wherein the disposable container further comprises a handle connector that is configured to reversibly engage the engagement component of the handle to the disposable container. In some embodiments, the handle connector is protruding away from the body in an angle perpendicular to the base.

In some embodiments, the handle connector and the engagement component are engaged by a bayonet mount mechanism. In some embodiments, the bayonet mount mechanism comprising one or more radially extended lugs disposed on the handle connector and one or more locking grooves formed on the engagement component to slidably receive and secure the radial lugs.

In some embodiments, the waste storage and collection device further includes a water bottle removably engaged with the handle. In some embodiments, the water bottle comprises a hollow channel configured to at least partially accommodate the handle.

In some embodiments, the handle further comprises at least one hook positioned proximate to the handle distal end for holding a wrap adapted to enclose the disposable container.

In some embodiments, the disposable container is configured to reversibly engage with an adaptor comprising: a shaft with a shaft proximal end and an opposing shaft distal end; a container engaging member disposed on the shaft distal end for engaging the disposable container; and an animal wearable connector disposed on the shaft proximal end for reversible connection with an animal wearable; such that the disposable container can be reversibly connected to the animal wearable by the adaptor.

In some embodiments, the disposable container further comprises a chamber adapted to receive a wipe.

In some embodiments, provided is a system for collecting and storing waste, comprising: (a) a disposable container comprising: (i) a body and a base; (ii) a plurality of panels extended from the base, each of the panels has a panel distal end extending away from the body, the panel distal ends of the panels pointing inwardly and defining an opening therebetween in an open state; (iii) at least one locking mechanism disposed on at least one of the panels; and (iv) a connector; and (b) a handle having a handle distal end configured to reversibly engage the connector to connect the handle and the disposable container. The handle and the disposable container are connected during use, and when a force is applied on the body to the panel distal ends against a target surface having a waste, the panel distal ends move inwards towards each other and in turn close up the opening to form a closed state, and the body and the panels together create a cavity, such that the waste can be scooped up from the target surface and accommodated within the cavity. The locking mechanism locks the panels in the closed state to store the waste within the cavity.

In some embodiments, the locking mechanism comprises a plurality of interlocking pins, wherein each interlocking pin comprises an attachment portion disposed on at least one of the panels and a locking portion adapted to interact with another interlocking pin of at least one adjacent panel, such that when the panels are in the closed state, the interlocking pins irreversibly interlock with each other to prevent the panels from opening.

In some embodiments, the attachment portion is attached to the panel distal end of at least one of the panels, and the locking portion extends away from the distal end and bends inwardly when the panels are in the open state.

In some embodiments, wherein the base further comprises a rim and at least one slot disposed on the rim, and wherein each panel comprises a panel inner surface for engaging with the rim and the locking mechanism further comprises at least one rib projecting from the panel inner surface with a shape complementary to the at least one slot, such that when the panels are in the closed state, the mating of the at least one slot and the at least one rib secures the engagement of each panel with the rim.

In some embodiments, the handle comprises an engagement component disposed on the handle distal end, and wherein the handle connector and the engagement component are engaged by a bayonet mount mechanism.

In some embodiments, the handle further comprises at least one hook positioned proximate to the handle distal end for holding a wrap adapted to enclose the disposable container.

In some embodiments, the system further comprising an adaptor configured to reversibly engage with the disposable container. The adaptor comprises: a shaft with a shaft proximal end and an opposing shaft distal end; a container engaging member disposed on the shaft distal end for engaging the disposable container; and an animal wearable connector disposed on the shaft proximal end for reversible connection with an animal wearable; such that the disposable container can be reversibly connected to the animal wearable by the adaptor.

In the following description, same numberings are employed to illustrate the same components of different figures.

Waste Collection and Storage Devices

Example 1

Figure 1B:
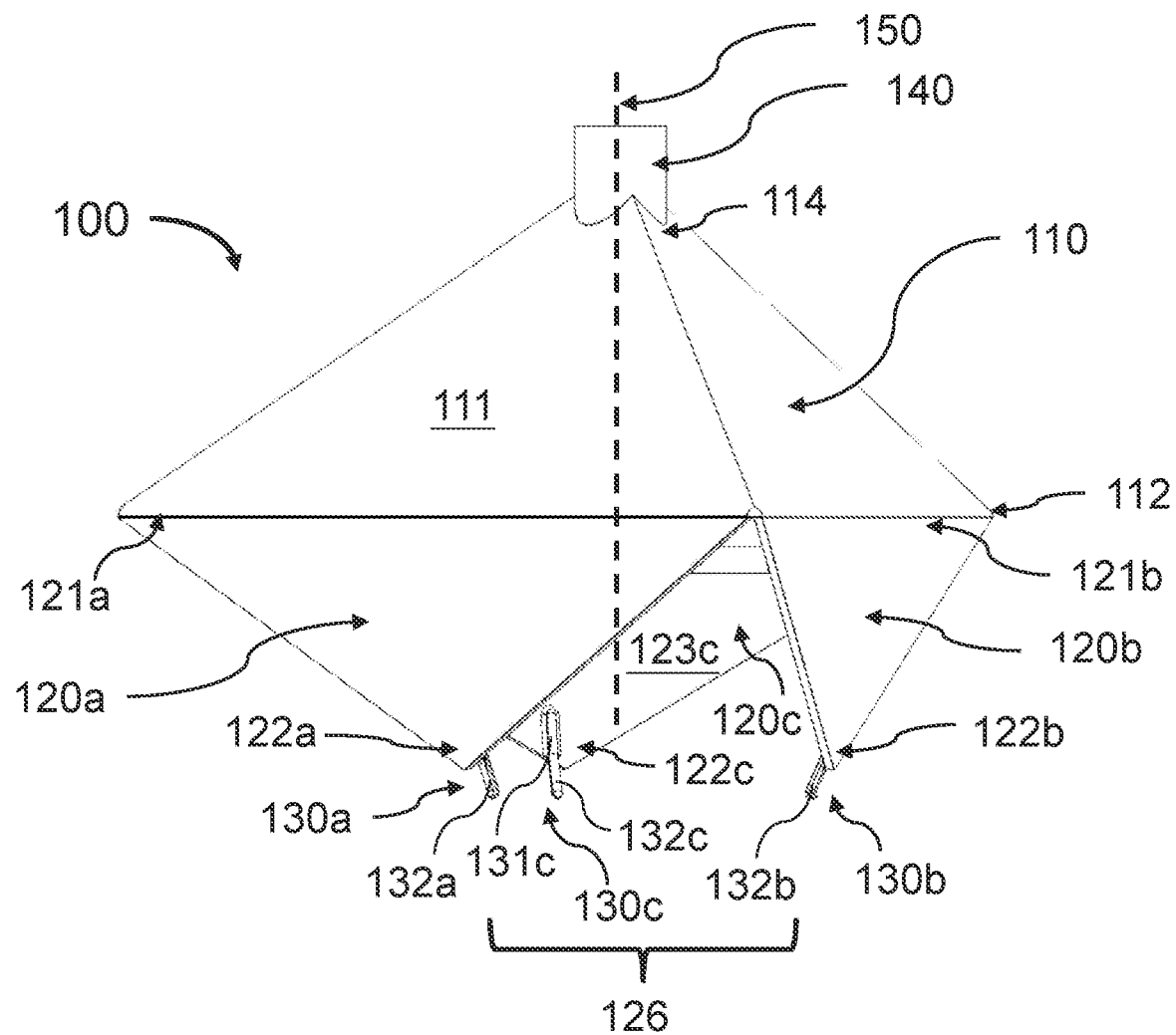

Referring now to FIGS. 1A-1G, which show an example embodiment of a waste collection and storage device 100. FIGS. 1A-1B show the waste collection and storage device 100 includes a disposable container 110 having a body 111 and a base 112. The device 100 further includes a first panel 120a, a second panel 120b, a third panel 120c extended from each edge of the base 112, and locking mechanisms disposed on each of the three panels 120a, 120b and 120c. In this example, the locking mechanisms includes a plurality of interlocking pins and a plurality of snap fit arrangements (slots and ribs), which will be described in more detail later.

In this embodiment, the body 111 has a generally triangular frusto-pyramid shape with a top end 114 opposite to the base 112. For ease of description, the direction towards the top end 114 is called top and the direction towards the base 112 is called bottom. The base 112 has a substantially flat bottom surface (shown in FIG. 1C) defining a base plane. The disposable container 110 has a central axis (shown as dotted line 150 in FIGS. 1A-1B) passing through the center of the top end 114 and the center of the base 112 and is substantially perpendicular to the base plane.

In some other embodiments, the body 111 can be of any other shapes, such as square-based pyramid, square-based frusto-pyramid, pentagonal pyramid, pentagonal frusto-pyramid, hexagonal pyramid, hexagonal frusto-pyramid, cube, cuboid, cylinder, cone, frusto-conical shape, triangular prism, hexagonal prism, and other polygonal shapes and non-polygonal shapes.

The disposable container 110 further includes a handle connector 140 extended from the top end 114 and configured to reversibly engage with a handle (not shown). In this embodiment, the handle connector 140 is disposed on the body 111 and protrudes away from the top end 114 along the central axis 150. The structure of the handle connector 140 will be described in detail later.

As shown in FIGS. 1A and 1B, the first panel 120a, the second panel 120b, and the third panel 120c are extended from a respective edge of the base 112 and have a general shape of a triangle. The first panel 120a has a panel proximal side 121a attached to the base 112 and a panel distal end 122a extending away from the body 111 which forms a vertex of the triangle opposite to the panel proximal side 121a. Similarly, the second panel 120b has a panel proximal side 121b attached to the base 112 and a panel distal end 122b extending away from the body 111 which forms a vertex of the triangle opposite to the panel proximal side 121b, and the third panel 120c has a panel proximal side 121c (shown in FIG. 1C) attached to the base 112 and a panel distal end 122c extending away from the body 111 which forms a vertex of the triangle opposite to the panel proximal side 121c.

The panels 120a, 120b and 120c can have two states, namely an open state and a closed state. FIGS. 1A and 1B also shows the configuration of the panels when they are in an open state. The first, second and third panels 120a, 120b and 120c extend downwardly away from the bottom surface of the base 112 slanting inwards at an angle. As used herein, the term "inwards" or "inwardly" refers to a direction towards the central axis 150 of the disposable container 110. The panel distal ends 122a, 122b and 122c of the first, second and third panels 120a, 120b and 120c respectively are equidistantly spaced apart from each other and point inwardly, defining an opening 126 therebetween in the open state. The first, second and third panels 120a, 120b and 120c also have a panel inner surface 123a (shown in FIG. 1C), 123b and 123c facing inwards when the panels are in an open state.

In this embodiment, the locking mechanism of the waste collection and storage device 100 includes three interlocking pins 130a, 130b and 130c disposed on the first, second and third panels 120a, 120b and 120c respectively. Each interlocking pin has a generally bent rod shape with an attachment portion disposed on each panel and a locking portion adapted to interact with another interlocking pin of the adjacent panel. For example, the interlocking pin 130b has an attachment portion 131b attached to the panel inner surface 123b of the second panel 120b in a position proximate to the panel distal end 122b and extending substantially perpendicular to the panel proximal side 121b (FIG. 1F). The interlocking pin 130b also has a locking portion 132b extending away from the panel distal end 122b and bending inwardly when it is in an open state (FIG. 1B). Similarly, the interlocking pin 130c has an attachment portion 131c attached to the panel inner surface 123c of the third panel 120c in a position proximate to the panel distal end 122c and extending substantially perpendicular to the panel proximal side 121 b. The interlocking pin 130c also has a locking portion 132c extending away from the panel distal end 122c and bending inwardly. Although not fully shown in FIGS. 1A and 1B, it is understood that the interlocking pin 130a has a similar structure to the interlocking pins 130b and 130c, including an attachment portion attached to the panel inner surface of the first panel 120a in a position proximate to the panel distal end 122a, and a locking portion 132a extending away from the panel distal end 122a and bending inwardly.

Figure 1C:
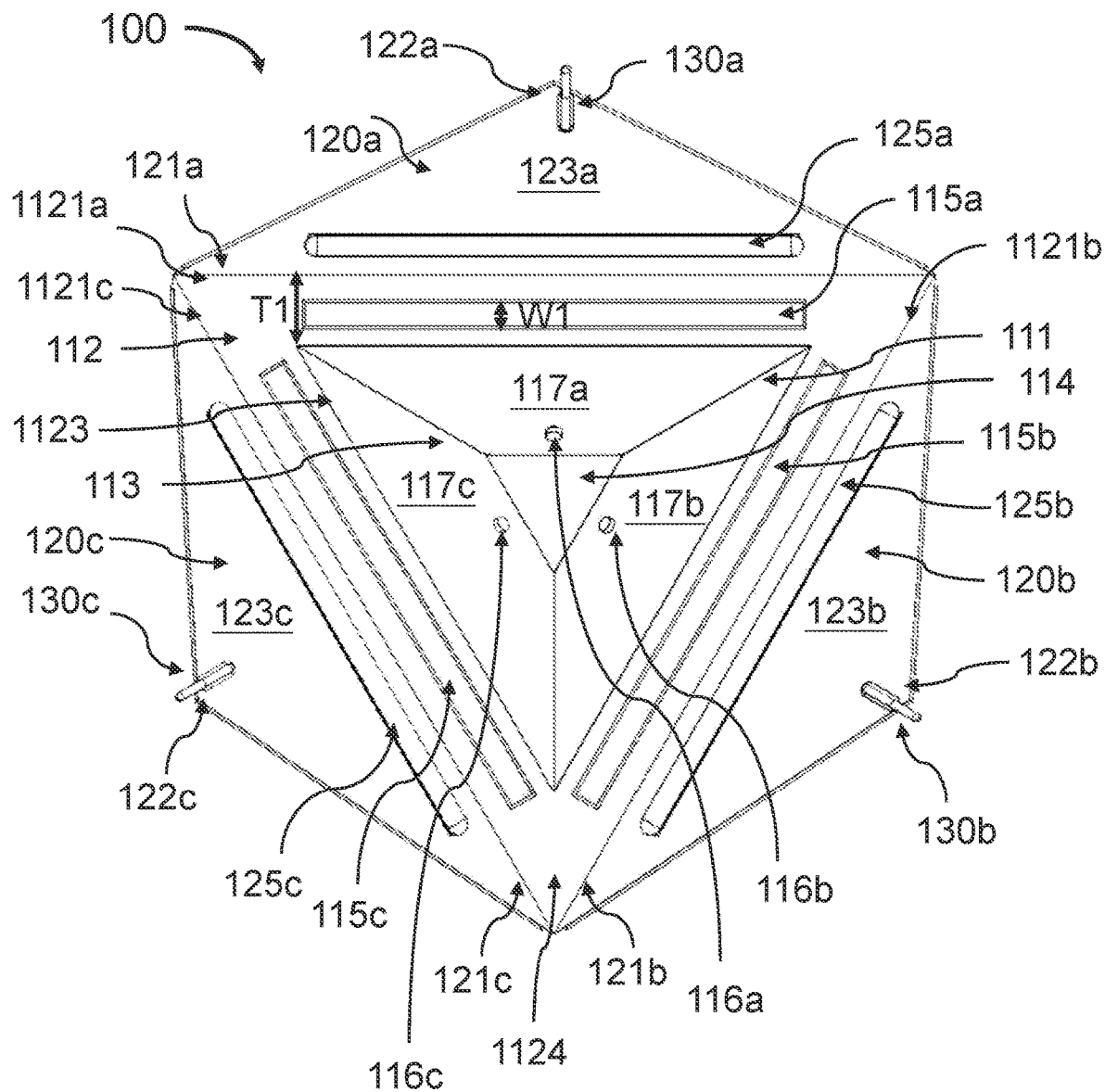
FIG. 1C is a bottom view of the waste collection and storage device of the same example embodiment as shown in FIG. 1A when the panels are fully expanded.

Referring now to FIG. 1C, which shows a bottom view of the waste collection and storage device 100 of the same example embodiment as shown in FIGS. 1A and 1B. To show the inner details of the device 100, the panels 120a, 120b and 120c are further expanded outwardly in FIG. 1C. In this embodiment, the base 112 can be substantially flat with a generally equilateral triangle shape with a first base edge 1121a, a second base edge 1121b, and a third base edge 1121c. The panel proximal side 121a of the first panel 120a is attached to and aligned along the first base edge 1121a, and has a substantially same length with the first base edge 1121a. The panel proximal side 121b of the second panel 120b is attached to and aligned along the second base edge 1121b, and has a substantially same length with the second base edge 1121b. The panel proximal side 121c of the third panel 120c is attached to and aligned along the third base edge 1121c, and has a substantially same length with the third base edge 1121c.

In this embodiment, the body 111 further includes an interior space 113 within the body 111, and the base 112 further includes a base opening 1123 The base 112 further includes a rim 1124 surrounding the base opening 1123 and extending inwardly from each of the base edges 1121a, 1121b and 1121c. In this embodiment, the rim 1124 extends inwardly from the base edges 1121a, 1121b and 1121c with generally the same thickness (represented as T1 in FIG. 1C). Three rectangular slots 115a, 115b and 115c can be disposed on the rim 1124. The rectangular slots 115a, 115b and 115c may have longitudinal sides that are generally parallel to the base edges 1121a, 1121b and 1121c respectively. In this embodiment, the width of the rectangular slots 115a, 115b and 115c are generally the same (represented as W1 in FIG. 1C). The thickness T1 of the rim 1124 is larger than the width W1 such that the slots 115a, 115b and 115c can fit within the rim 1124.

In this embodiment, the locking mechanism of the waste collection and storage device 100 further includes three snap fit arrangements including slots 115a, 115b and 115c disposed on the rim 1124 and three ribs 125a, 125b and 125c disposed on the first, second and third panels 120a, 120b and 120c respectively. The rib 125a projects from the panel inner surface 123a of the first panel 120a, and has a shape complementary to the rectangular slot 115a. The rib 125b projects from the panel inner surface 123b of the second panel 120b, and has a shape complementary to the rectangular slot 115b. The rib 125c projects from the panel inner surface 123c of the third panel 120c, and has a shape complementary to the rectangular slot 115c. In this embodiment, the panel inner surfaces 123a, 123b and 123c are configured to engage with the rim 1124 when the panels are in a closed state, and the rectangular slots 115a, 115b and 115c are configured to securely receive the ribs 125a, 125b and 125c respectively when the panels are in the closed state.

As described above, the body 111 has a generally frusto-pyramidal shape and includes the interior space 113 therewithin. The frusto-pyramidal body 111 has three trapezoidal interior surfaces 117a, 117b and 117c facing the interior space 113. Three protrusions 116a, 116b and 116c are disposed on the interior surfaces 117a, 117b and 117c respectively in a position proximate to the top end 114 of the body 111. These protrusions are used for interacting with an adaptor, which will be described in detail later.

Figure 1D:
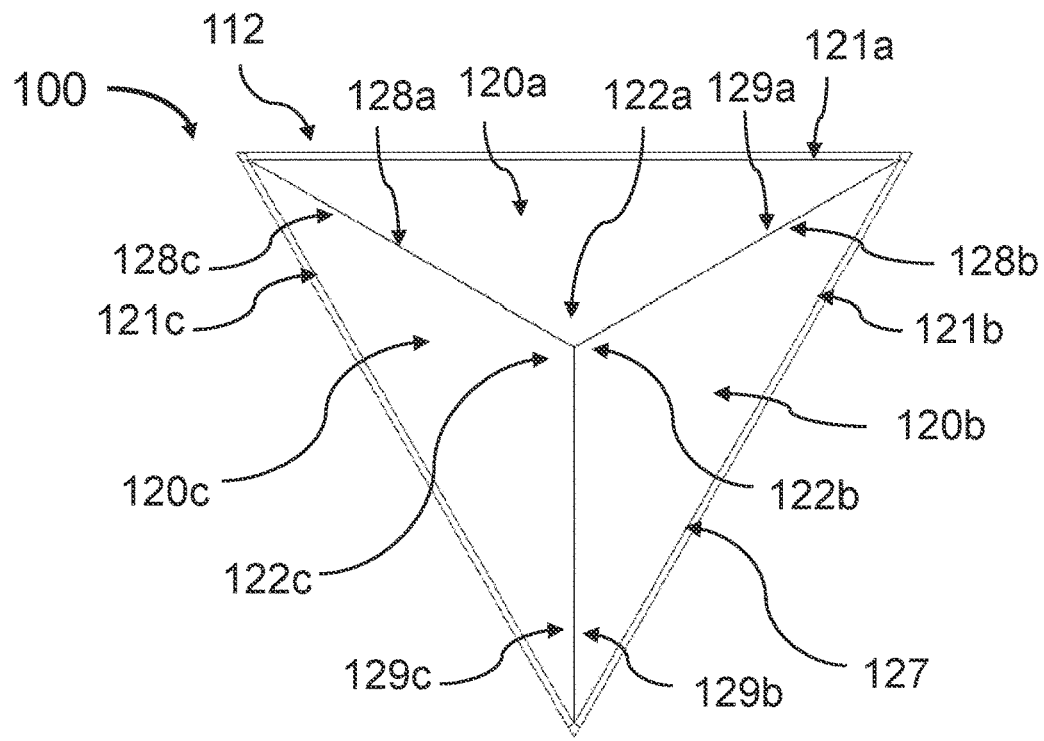
FIG. 1D is a bottom view of the waste collection and storage device of the same example embodiment as shown in FIG. 1A when the panels are in a closed state.

Referring now to FIG. 1D, which shows a bottom view of the waste collection and storage device 100. In this figure, the first, second and third panels 120a, 120b and 120c are in a closed state. The first panel 120a has two panel sides 128a and 129a other than the panel proximal side 121a. The second panel 120b has two panel sides 128b and 129b other than the panel proximal side 121b. The third panel 120c has two panel sides 128c and 129c other than the panel proximal side 121c. When closing up the device, the first, second and third panels 120a, 120b and 120c taper inwardly and get proximate to each other until the panel sides 128a-c and 129a-c and the panel distal ends 122a, 122b and 122c are substantially in close proximity with each other, respectively. The first, second and third panels 120a, 120b and 120c have complementary profiles with each other so that when they abut each other in the closed state, the panels 120a, 120b and 120c form a substantially contiguous surface 127 sufficient to cover the base 112. In this embodiment, when the three triangular panels abut each other in the closed state, each panel adjoins with the adjacent panels at two panel sides other than the panel proximal side (the panel side 128a adjoins with the panel side 128c, the panel side 129a adjoins with the panel side 128b, the panel side 129b adjoins with the panel side 129c), and the panel distal ends 122a, 122b and 122c adjoin each other at a center of the substantially contiguous surface 127 formed by the panels, as shown in FIG. 1D.

Figure 1E:
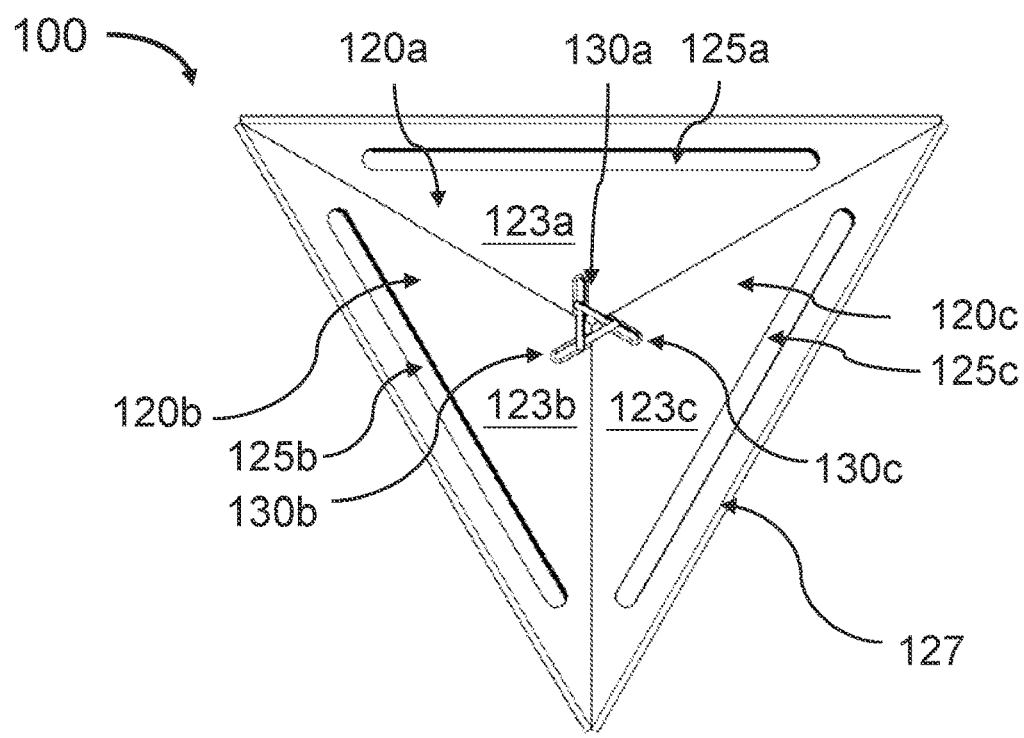
FIG. 1E is a schematic top view of the panels of the waste collection and storage device (without showing the disposable container) of the same example embodiment as shown in FIG. 1A when the panels are in a closed state.
Figure 1F:
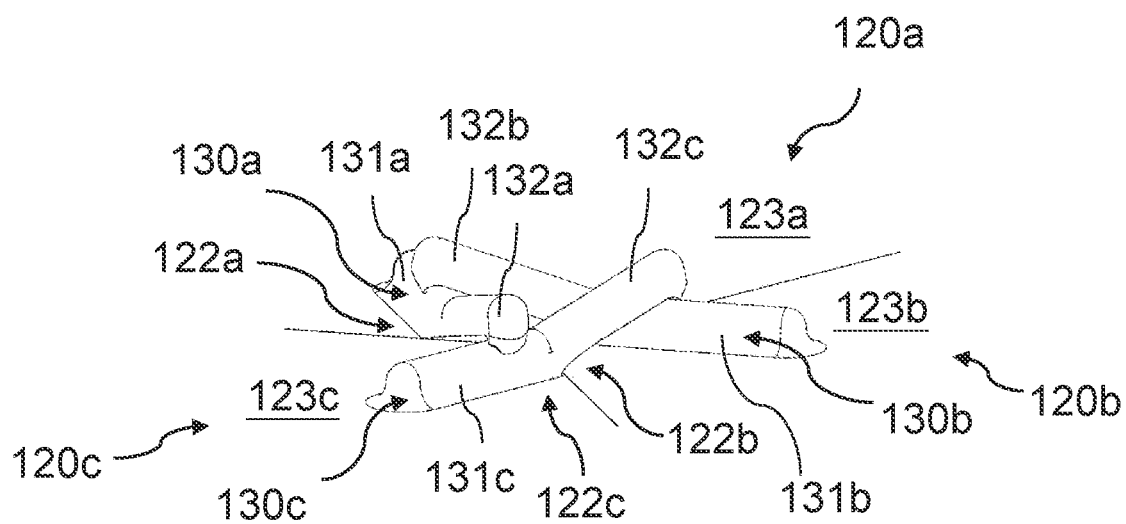
FIG. 1F is an isometric, enlarged view illustrating a locking mechanism of interlocking pins as shown in FIG. 1E when the panels are in a closed state.

Referring now to FIG. 1E, which shows a schematic top view of the panels of the waste collection and storage device 100 (without showing the disposable container 110 in FIG. 1A) when the panels 120a, 120b and 120c are in the closed state. The locking mechanisms disposed on the three panels lock the panels together in the closed state. The locking mechanisms include three interlocking pins 130a, 130b and 130c disposed on the first, second and third panels 120a, 120b and 120c respectively. In the closed state, the interlocking pins 130a, 130b and 130c irreversibly interlock with each other to prevent the panels from opening. The interaction between the interlocking pins 130a, 130b and 130c will be described in detail later. In some other embodiments, the locking mechanisms may include only one or two interlocking pins disposed on one or two of the panels respectively. In some other embodiments, the locking mechanisms may not include any interlocking pin disposed on the panel. In some other embodiments, the waste collection and storage device 100 may be provided with one or more irreversible locking mechanisms known in the art. By way of example, the one or more locking mechanisms may include adhesives, and/or magnetic locks.

In this embodiment, the locking mechanism also includes snap-fit arrangements in the form of the three elongated ribs 125a, 125b and 125c project from the panel inner surface 123a, 123b and 123c of the first panel 120a, the second panel 120b and the third panel 120c respectively. Each rib is shaped as a generally rectangular bar with rounded corners and configured to be securely received by the corresponding elongated slot disposed on the base (not shown) when the panels are in the closed state. In some other embodiments, the locking mechanisms may include only one or two ribs disposed on one or two of the panels respectively. In some other embodiments, the locking mechanisms may not include any rib disposed on the panel. In some other embodiments, the number of rib and slot can vary, for example, one or more ribs and slots for each panel.

Referring now to FIG. 1F, which shows a close up view of the locking mechanism of interlocking pins 130a, 130b and 130c as shown in FIG. 1E when the panels 120a, 120b and 120c are in the closed state. The interlocking pin 130a is an elongated rod with the attachment portion 131a attaching to the first panel 120a and extending in a direction substantially parallel to the plane of the panel inner surface 123a towards the panel distal end 122a, and the locking portion 132a extending away from the panel distal end 122a and bending with a defined angle away from the plane of the panel inner surface 123a. Similarly, the interlocking pin 130b is an elongated rod with the attachment portion 131b attaching to the second panel 120b and extending parallel to the plane of the panel inner surface 123b towards the panel distal end 122b, and the locking portion 132b extending away from the panel distal end 122b and bending with a defined angle away from the plane of the panel inner surface 123b. The interlocking pin 130c is an elongated rod with the attachment portion 131c attaching to the third panel 120c and extending parallel to the plane of the panel inner surface 123c towards the panel distal end 122c, and the locking portion 132c extending away from the panel distal end 122c and bending with a defined angle away from the plane of the panel inner surface 123c.

As shown in FIG. 1F, when the panels 120a, 120b and 120c abut each other in the closed state, the panel distal ends 122a, 122b and 122c adjoin each other at a center point. The locking portion 132a of the interlocking pin 130a lays on top of the attachment portion 131c of the interlocking pin 130c. The locking portion 132b of the interlocking pin 130b lays on top of the attachment portion 131a of the interlocking pin 130a. The locking portion 132c of the interlocking pin 130c lays on top of the attachment portion 131b of the interlocking pin 130b. Such configuration causes the interlocking pins 130a, 130b and 130c to irreversibly interlock with each other, thereby preventing the panels from opening. As such, the target object will be locked and stored within the container.

Figure 1G:
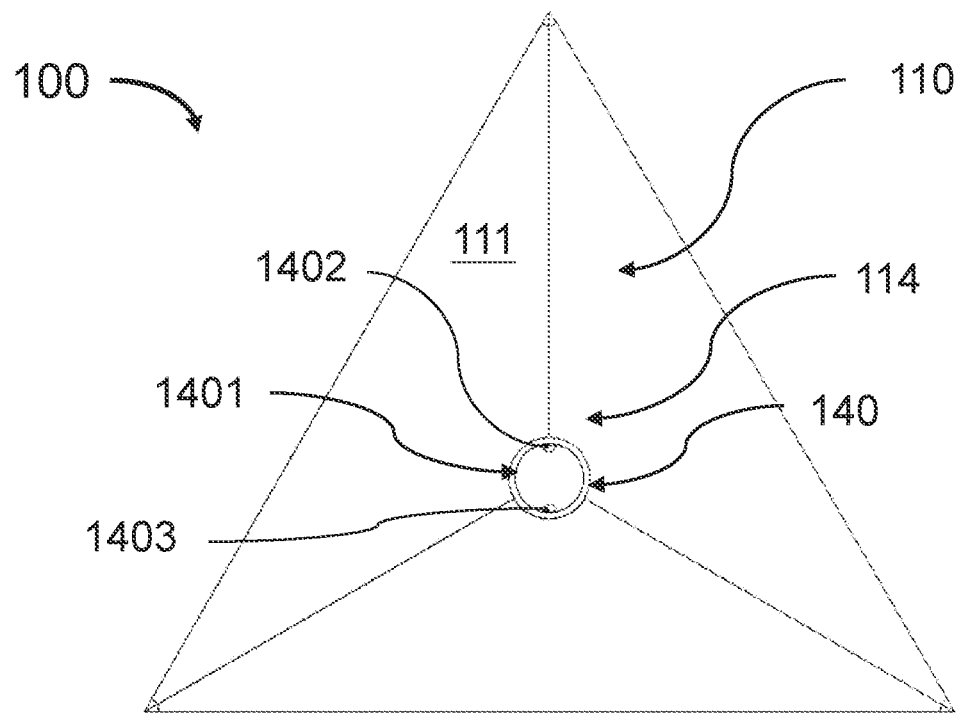
FIG. 1G is a top view of the waste collection and storage device of the same example embodiment as shown in FIG. 1A.

Referring now to FIG. 1A and FIG. 1G, the disposable container 110 further comprises a handle connector 140 protruding away from the top end 114 of the body 111 along the central axis 150. In this embodiment, the handle connector 140 has a shape of a hollow cylinder with an interior surface 1401. The handle connector 140 comprises two radially extended inner lugs 1402 and 1403 disposed on the interior surface 1401. These lugs 1402 and 1403 are adapted for interacting with a handle, which will be described in detail later.

Example 2

Figure 2:
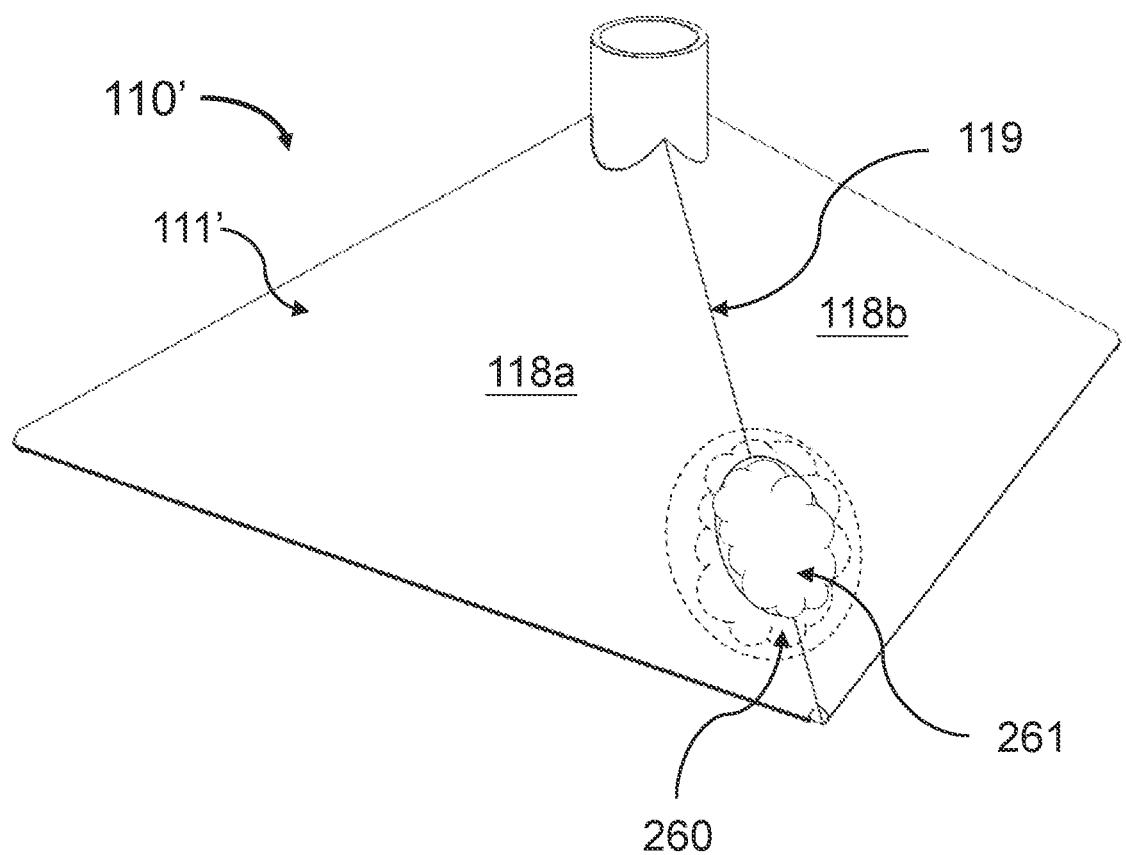
FIG. 2 shows a perspective view of a disposable container with a chamber to receive a wipe according to an example embodiment.

Referring now to FIG. 2, which shows another example embodiment of a disposable container 110'. In this embodiment, the disposable container 110' has a generally similar structure to the disposable container 110 as described in Example 1. Two lateral faces 118a and 118b of the generally frusto-pyramid body 111' is shown here in FIG. 2. In this example, the disposable container 110' further comprises a chamber 260 adapted to receive a wipe 261. In this embodiment, the chamber 260 is disposed on a lateral edge 119 between the lateral faces 118a and 118b and has a shape of an oval. In some embodiments, the wipe 261 can be one or more pieces of tissue paper that can be used for cleaning a pet animal. By way of example, one or more chambers may be provided in the container at various locations. By way of example, the one or more chambers may also be provided in any other example waste collection and storage devices described herein, including but not limited to the disposable container as described in Example 2 to Example 5.

Example 3

Figure 3A:
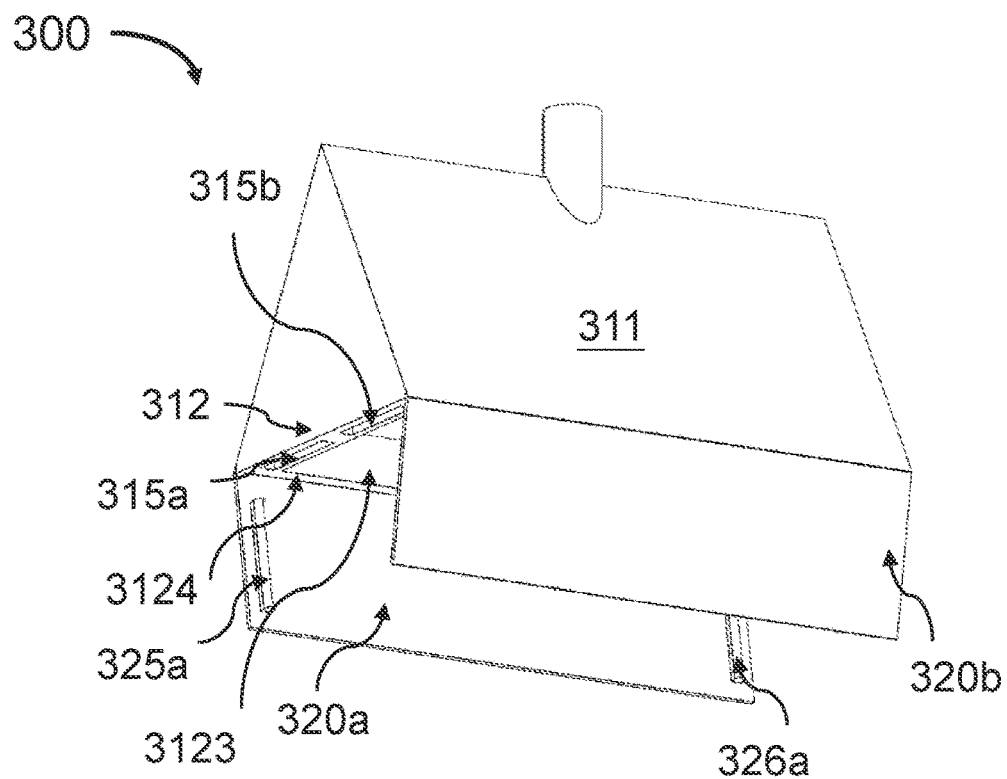
FIG. 3A is an isometric view of a waste collection and storage device with a rectangular base and two panels in an open state according to another example embodiment.
Figure 3B:
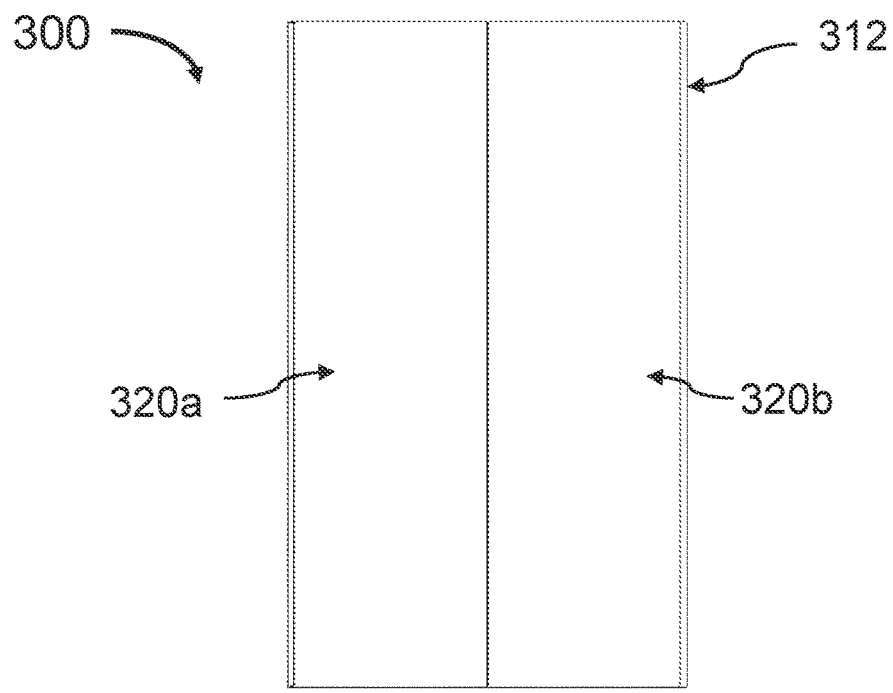
FIG. 3B is a bottom view of the waste collection and storage device of the same example embodiment as shown in FIG. 3A when the panels are in a closed state.

Referring now to FIGS. 3A and 3B, which show a waste collection and storage device 300 according to another example embodiment. The waste collection and storage device 300 includes a body 311 with a generally triangular prism shape, a rectangular base 312, and two rectangular panels 320a and 320b extended from the base 312. In this embodiment, the base 312 further comprises a base opening 3123, a rim 3124 surrounding the base opening 3123, and four slots disposed on the rim 3124. Only two slots 315a and 315b disposed on a shorter side of the rim 3124 are shown here in FIG. 3A, but it is understood that another two slots are present on the opposite shorter side of the rim 3124. In this embodiment, the waste collection and storage device 300 includes a locking mechanism comprising two ribs projecting from each of the panels 320a and 320b with a shape complementary to the four slots on the rim 3124 respectively. Only two ribs 325a (complementary to the slot 315a) and 326a disposed on the panel 320a are shown here in FIG. 3A, but it is understood that another two ribs are present on the panel 320b as well. When the panels 320a and 320b are in the closed state (as shown in FIG. 3B), the panels abut each other to form a substantially contiguous surface sufficient to cover the base 312. The mating of the slots and the ribs secures the engagement of each panel with the rim 3124. In this embodiment, the locking mechanism does not include interlocking pins disposed on the panels. In some other embodiments, the locking mechanism may include a plurality of interlocking pins disposed on the panels.

Example 4

Referring now to FIGS. 4A and 4B, which show a waste collection and storage device 400 according to another example embodiment. The waste collection and storage device 400 includes a body 411 with a generally square-based pyramid shape, a generally square base 412, and four triangular panels 420a, 420b, 420c and 420d extended from the base 412. In this embodiment, the waste collection and storage device 400 includes a locking mechanism comprising four interlocking pins 430a, 430b, 430c and 430d disposed on the four panels 420a, 420b, 420c and 420d respectively. When the panels 420a, 420b and 420c and 420d are in the closed state (as shown in FIG. 4B), the panels abut each other to form a substantially contiguous surface sufficient to cover the base 412. The interlocking pins irreversibly interlock with each other to prevent the panels from opening. In some embodiments, the locking mechanism may further include one or more snap fit arrangements (slots and ribs) similar to those as described in Example 1 (FIG. 1C) to additionally secure the engagement of each panel with the base.

Example 5

Referring now to FIGS. 5A and 5B, which show a waste collection and storage device 500 according to another example embodiment. The waste collection and storage device 500 includes a body 511 with a generally pentagonal pyramid shape, a generally pentagonal base 512, and five triangular panels 520a, 520b, 520c, 520d and 520e extended from the base 512. In this embodiment, the waste collection and storage device 500 includes a locking mechanism comprising five interlocking pins 530a, 530b, 530c and 530d and 530e disposed on the five panels 520a, 520b, 520c, 520d and 520e respectively. When the panels 520a, 520b, 520c, 520d and 520e are in the closed state (as shown in FIG. 5B), the panels abut each other to form a substantially contiguous surface sufficient to cover the base 512. The interlocking pins irreversibly interlock with each other to prevent the panels from opening. In some embodiments, the locking mechanism may further include one or more snap fit arrangements (slots and ribs) similar to those as described in Example 1 (FIG. 1C) to additionally secure the engagement of each panel with the base.

Adaptor

Example 6

Figure 6A:
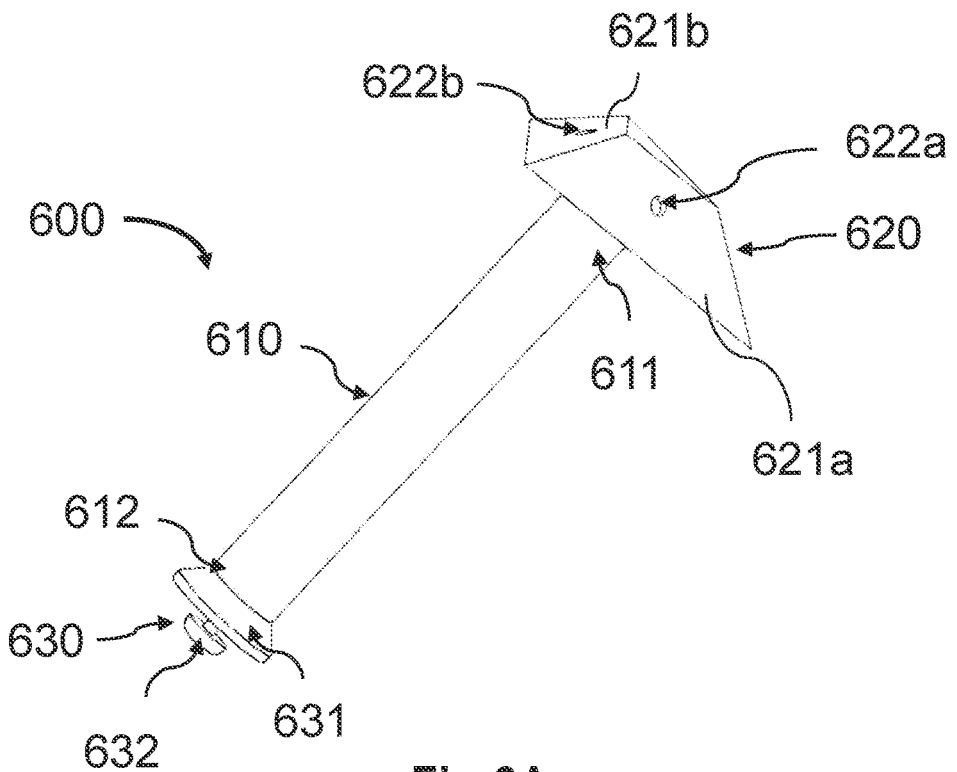
FIG. 6A is a perspective view of an adaptor according to an example embodiment.
Figure 6B:
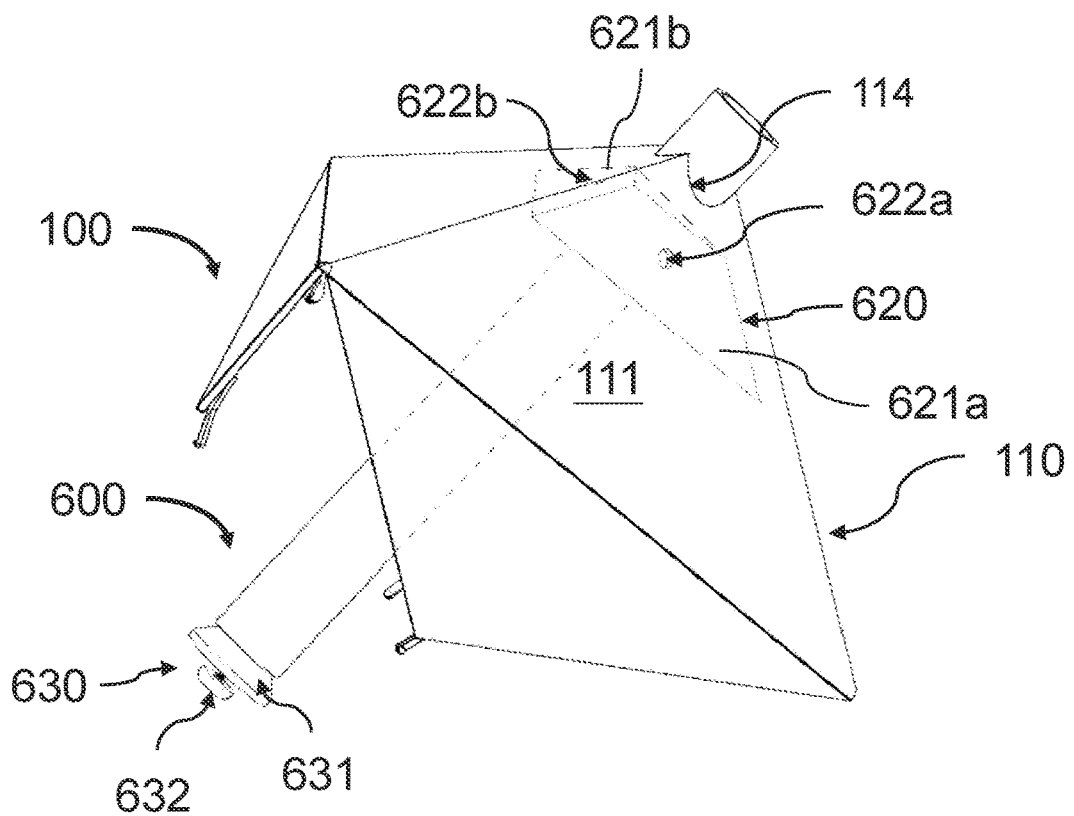
FIG. 6B illustrates the adaptor as shown in FIG. 6A engaging with a disposable container according to an example embodiment.

Referring now to FIGS. 6A and 6B, which show an adaptor 600 configured to reversibly engage with the disposable container 110 of the waste collection and storage device 100 as described in Example 1. The adaptor 600 comprises a middle shaft 610, a distal, container engaging member 620 and a proximal wearable connector 630. In this embodiment, the cylindrical shaft 610 has a shaft proximal end 612 and an opposing shaft distal end 611. The container engaging member 620 is disposed on the shaft distal end 611 for engaging the disposable container 110. In this embodiment, the container engaging member 620 has a generally triangular frustum shape with three generally trapezoidal sides. In some other embodiments, the container engaging member 620 can be in any other polygonal or non-polygonal shapes and sizes adapted to fit at least a portion of the container 110. Only two trapezoidal sides 621a and 621b are shown here in FIGS. 6A and 6B, but it is understood that a third trapezoidal side is also present. The container engaging member 620 also includes a notch disposed on each of the three trapezoidal sides respectively. Notches 622a and 622b are disposed on the trapezoidal sides 621a and 621b respectively, and it is understood that a third notch is disposed on the third trapezoidal side (not shown).

Still referring to FIGS. 6A and 6B, the wearable connector 630 is disposed on the shaft proximal end 612. In this embodiment, the wearable connector 630 includes a conical connector body 631 fixedly attached to the shaft proximal end 612 and a knob 632 protruding away from the connector body 631 for reversible connection with a wearable (not shown). In one embodiment, the wearable is an animal (e.g., pet) collar so that the waste collection and storage device can be carried by the animal wearing the animal collar. By way of example, the wearable may be a user's bag. In some other embodiments, the adaptor may be adapted to fit at least a portion of the waste collection and storage device.

Referring now to FIGS. 1C and 6B together. FIG. 6B shows the adaptor 600 that is engaged with the disposable container 110 when the panels are in the open state. The container engaging member 620 is inserted into the interior space 113 of the body 111 (FIG. 1C) towards the top end 114, and the generally triangular frustum shape of the container engaging member 620 is adapted to match the shape of at least a portion of the interior space 113. When the adaptor 600 and the disposable container 110 is engaged, the notches 622a, 622b and the third notch (not shown) mate with the three protrusions 116a, 116b and 116c of the body 111 respectively to secure the engagement of the adaptor 600 and the disposable container 110. In such way, the disposable container 110 can be reversibly connected to the wearable (not shown) by the adaptor 600, such that the disposable container 110 can be carried along by a pet animal wearing the animal wearable.

In some other embodiments, the adaptor 600 is configured to reversibly engage with the disposable container of the waste collection and storage device as described in any other examples, including but not limited to the disposable container as described in Example 2 to Example 5. By way of examples, other reversible engagement mechanisms known in the art may be used instead of the notches and protrusions.

Handles

Example 7

Figure 7A:
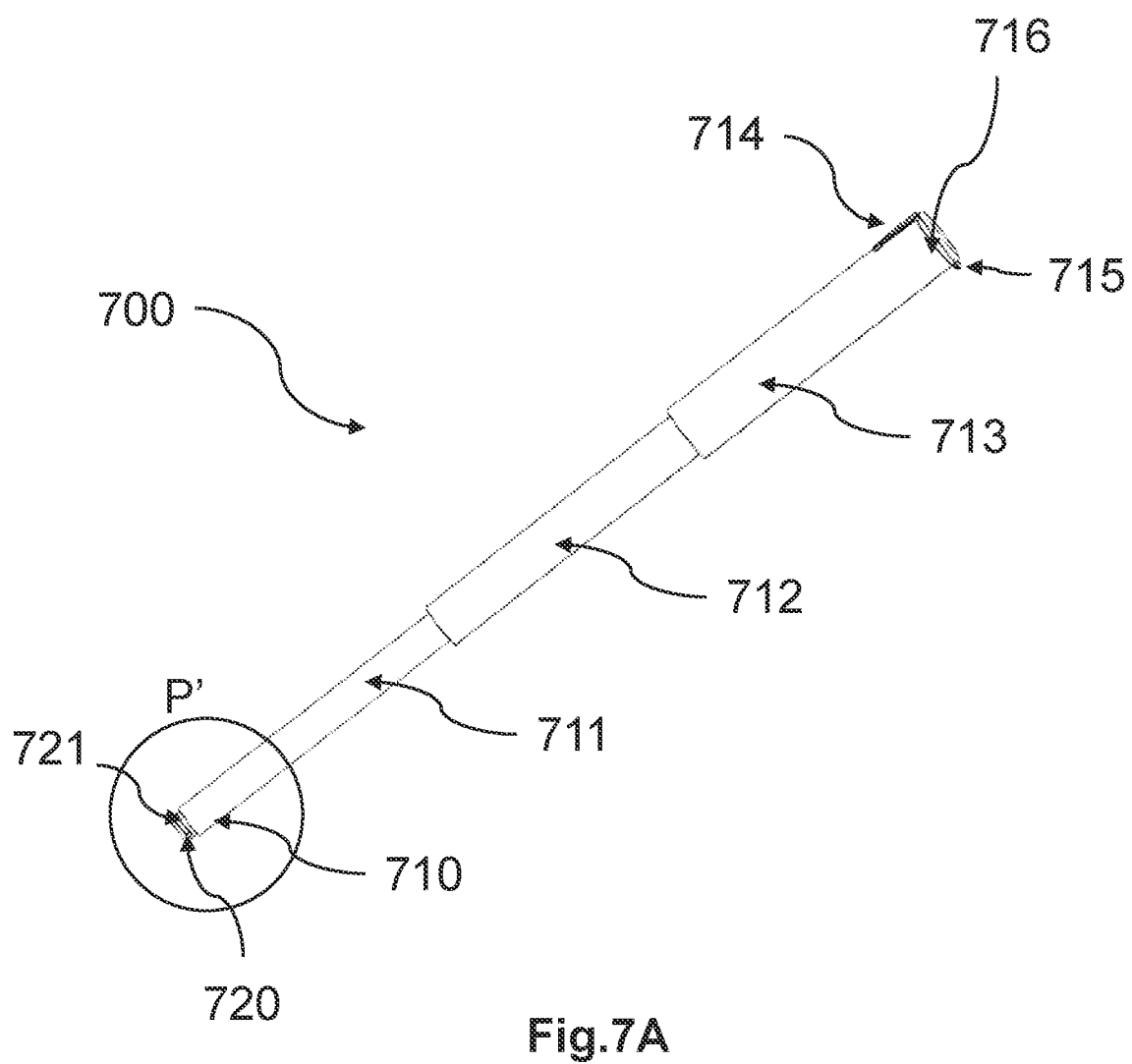
FIG. 7A is a side view of an extendable handle according to an example embodiment.
Figure 7B:
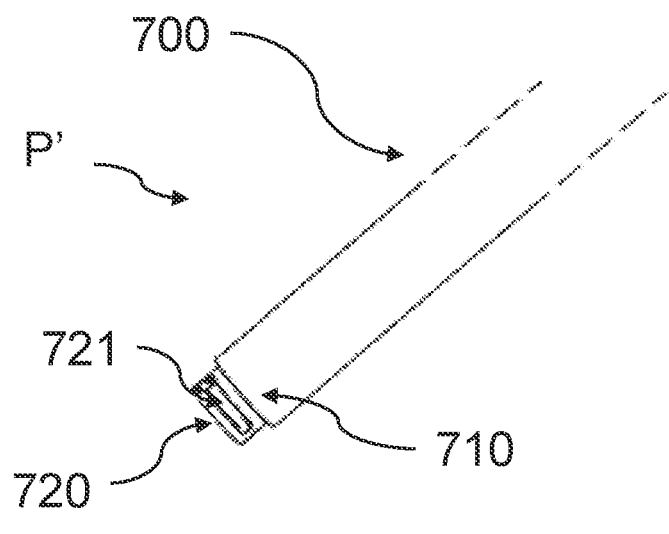
FIG. 7B shows a close-up view of an area P' of FIG. 7A.

Referring now to FIGS. 7A and 7B, which show an elongated handle 700 having a handle distal end 710 and an opposing handle proximal end 716. In this embodiment, the handle 700 is an extendable handle. The extendable handle 700 includes three separate segments that are joined and longitudinally extendable and retractable in relation to each other, namely a handle distal segment 711 at the handle distal end 710, a handle proximal segment 713 at the handle proximal end 716, and a handle middle segment 712 positioned in between. The extendable handle 700 further includes an engagement component 720 disposed on the handle distal end 710. The engagement component 720 is configured to reversibly engage with the handle connector 140 of the disposable container in Example 1 (shown in FIGS. 1A and 1G) to connect the extendable handle 700 and the disposable container. In this embodiment, the handle connector and the engagement component 720 are engaged by a bayonet mount mechanism. The engagement component 720 has a generally ring shape with an outer circumference sized slightly smaller than inner circumference of the handle connector such that the engagement component 720 can fit within the interior of the handle connector when they are engaged with each other. A generally L-shaped locking groove 721 is formed on the engagement component 720 to slidably receive and secure one of the lugs 1402 and 1403 (shown in FIG. 1G) of the handle connector. Although not shown in FIGS. 7A and 7B, it is understood that another generally L-shaped locking groove is present on the opposite side of the engagement component 720 to slidably receive and secure another one of the lugs 1402 and 1403.

In some other embodiments, the handle connector and the engagement component may be engaged by a different mounting mechanism or locking method for reversible connection. Examples of these mounting, coupling, clasping mechanisms or locking methods include but not limited to bolted joint, snap fit locking mechanism, magnetic locking mechanism and push-pull coupling mechanism.

In this embodiment, a clip 714 can be optionally provided on the extendable handle 700 proximate to the handle proximal end 716 for attaching or hanging the extendable handle 700 to an object. A strap ring 715 can be optionally provided on the extendable handle 700 proximate to the handle proximal end 716 for attaching the extendable handle 700 to a strap, for example a hand strap.

Example 8

Figures 8A, 8B:
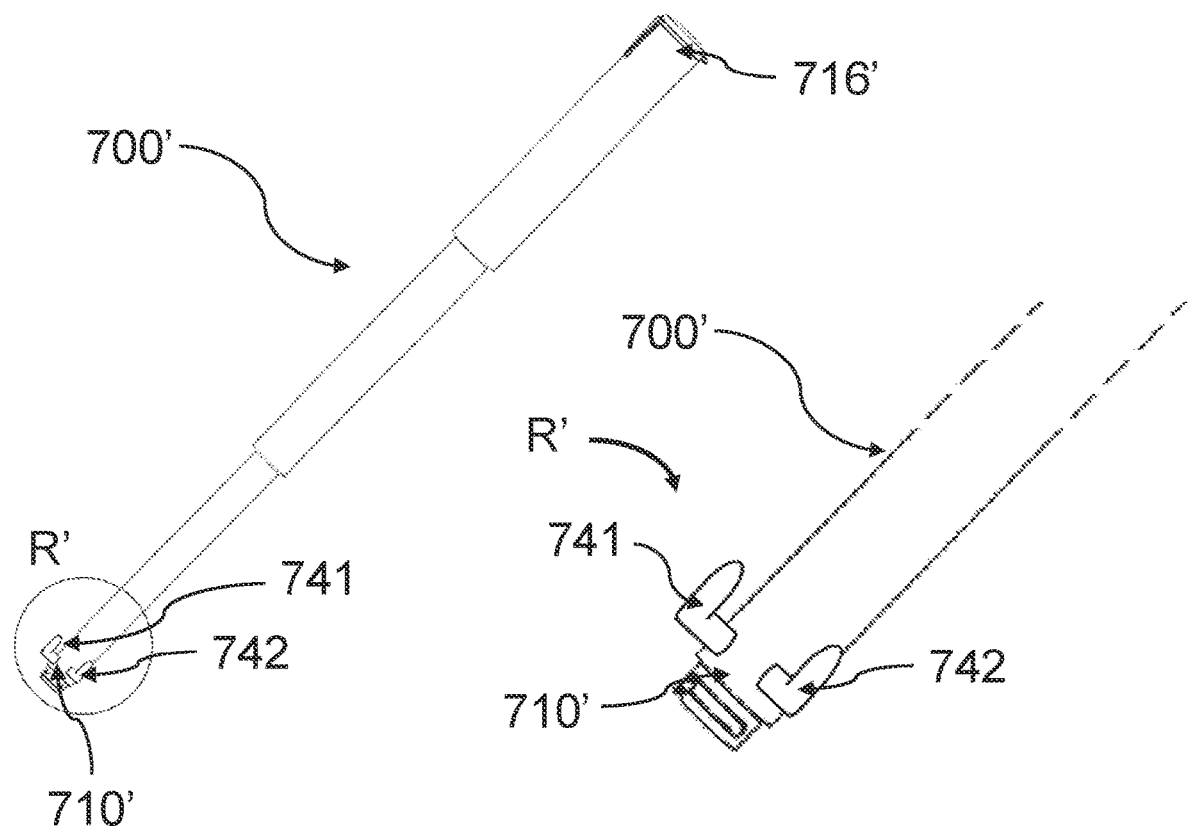
FIG. 8A is a side view of an extendable handle according to another example embodiment.
FIG. 8B shows a close-up view of an area R' of FIG. 8A.

Referring now to FIGS. 8A and 8B, which show another embodiment of an extendable handle 700' having a handle distal end 710' and an opposing handle proximal end 716'. The extendable handle 700' has a largely similar structure to the extendable handle 700 as described in Example 7. In this embodiment, the extendable handle 700' further includes hooks 741 and 742 positioned proximate to the handle distal end 710' and bending towards the direction of the handle proximal end 716'. The hooks 741 and 742 are radially disposed round the extendable handle 700'. Although not shown in FIGS. 8A and 8B, it is understood that another hook may be present on the opposite side of the extendable handle 700'. In some embodiments, different number of hooks e.g., one, two, three, four, five or even more hooks may be radially disposed round the extendable handle 700' proximate to the handle distal end 710'. By way of example, the hooks can be used to hold an object such as a pocket, a sac, a piece of cling wrap or a bag, so that the device can be further contained within the object for wrapping.

Additional Components Attachable to Handles

Example 9

Bottle

Figure 9A:
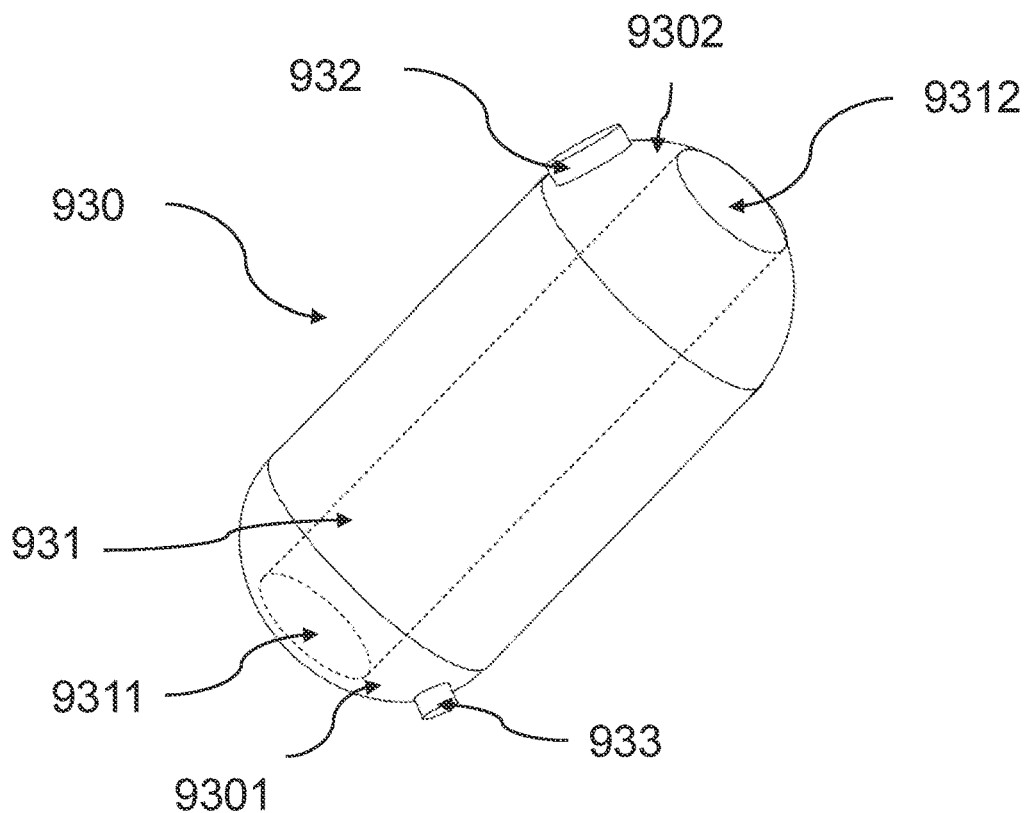
FIG. 9A is a perspective view of a water bottle according to an example embodiment.

Referring now to FIG. 9A, which show a bottle 930 for containing liquids therein. As an example, the bottle 930 is a water bottle having a volume for containing water. The water bottle 930 has a bottle distal end 9301 and an opposing bottle proximal end 9302. The water bottle 930 includes a cylindrical, hollow channel 931 disposed therewithin with a channel distal opening 9311 at the bottle distal end 9301 and a channel proximal opening 9312 at the bottle proximal end 9302. The channel 931 is sized and shaped adapted for receiving at least a portion of the proximal portion of a handle. In some other embodiments, the water bottle 930 may further comprise a cap disposed at the channel distal opening 9312. The water bottle 930 further includes a water inlet 932 positioned proximate to the bottle proximal end 9302 and a water outlet 933 positioned proximate to the bottle distal end 9301. In some embodiments, bottle caps are provided to close the water inlet 932 and/or water outlet 933.

Figure 9B:
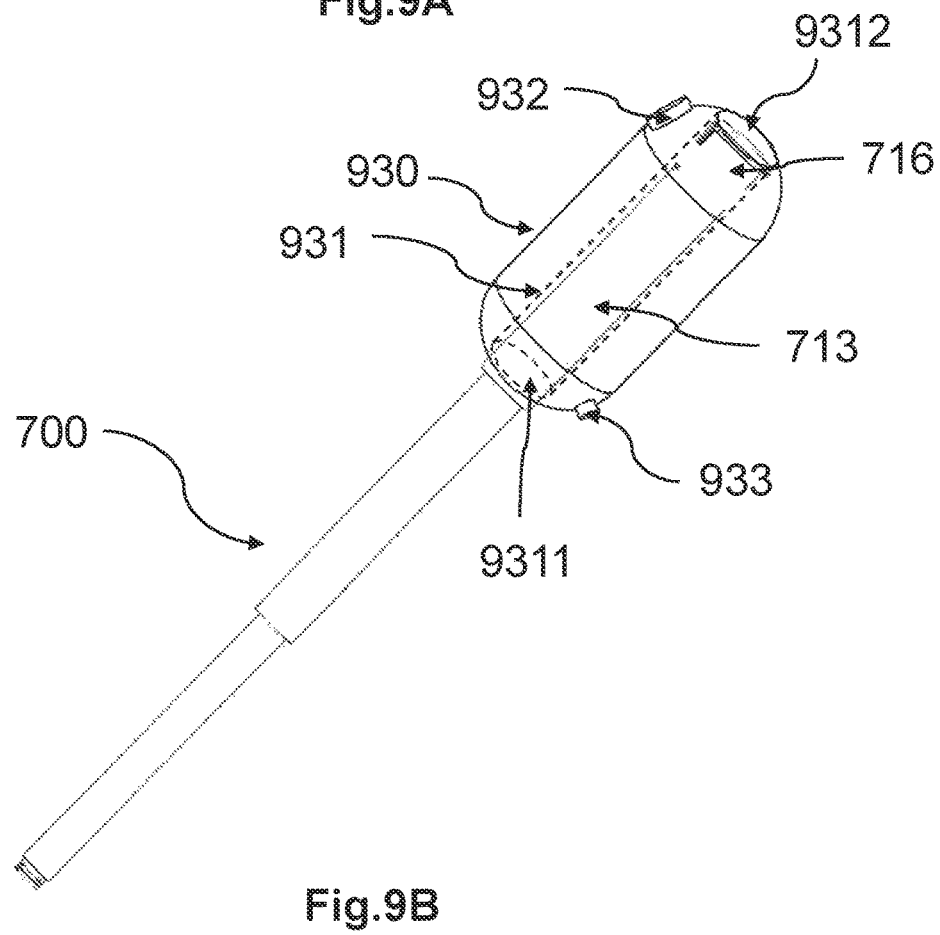
FIG. 9B illustrates the water bottle as shown in FIG. 9A engaged to an extendable handle according to an example embodiment.

Referring now to FIG. 9B, which shows the water bottle 930 can be removably attached to the extendable handle 700 as described in Example 7. In another embodiment, the water bottle 930 can be removably attached to any handles as described in any other examples, including but not limited to the extendable handle 700' as described in Example 8. The hollow channel 931 has an inner diameter slightly larger than the outer diameter of the proximal portion of the handle. In this embodiment, the hollow channel 931 is sized such that when the handle proximal segment 713 of the extendable handle 700 is frictionally fit into the hollow channel 931 via the channel distal opening 9311, the handle proximal segment 713 is held securely by the hollow channel 931 with the handle proximal end 716 positioned proximate to the channel proximal opening 9312. The water bottle 930 may be pre-filled with water via the water inlet 932. During use, a user may remove the bottle cap of the water outlet 933 to release the water inside the water bottle 930 onto a target surface to clean up the target surface conveniently. By way of example, the water bottle 930 may be made of flexible material such as soft or squeezable plastics (e.g., LDPE, HDPE, PET), so that when pressure is applied to the water bottle 930 by user's hand forces, liquid inside can be squeezed out of the outlet as a narrow stream to the target surface. In some other embodiments, the water bottle and the handle may be engaged by a different mounting or attachment mechanisms known in the art.

Systems for Collecting and Storing Waste

Example 10

Figure 10A:
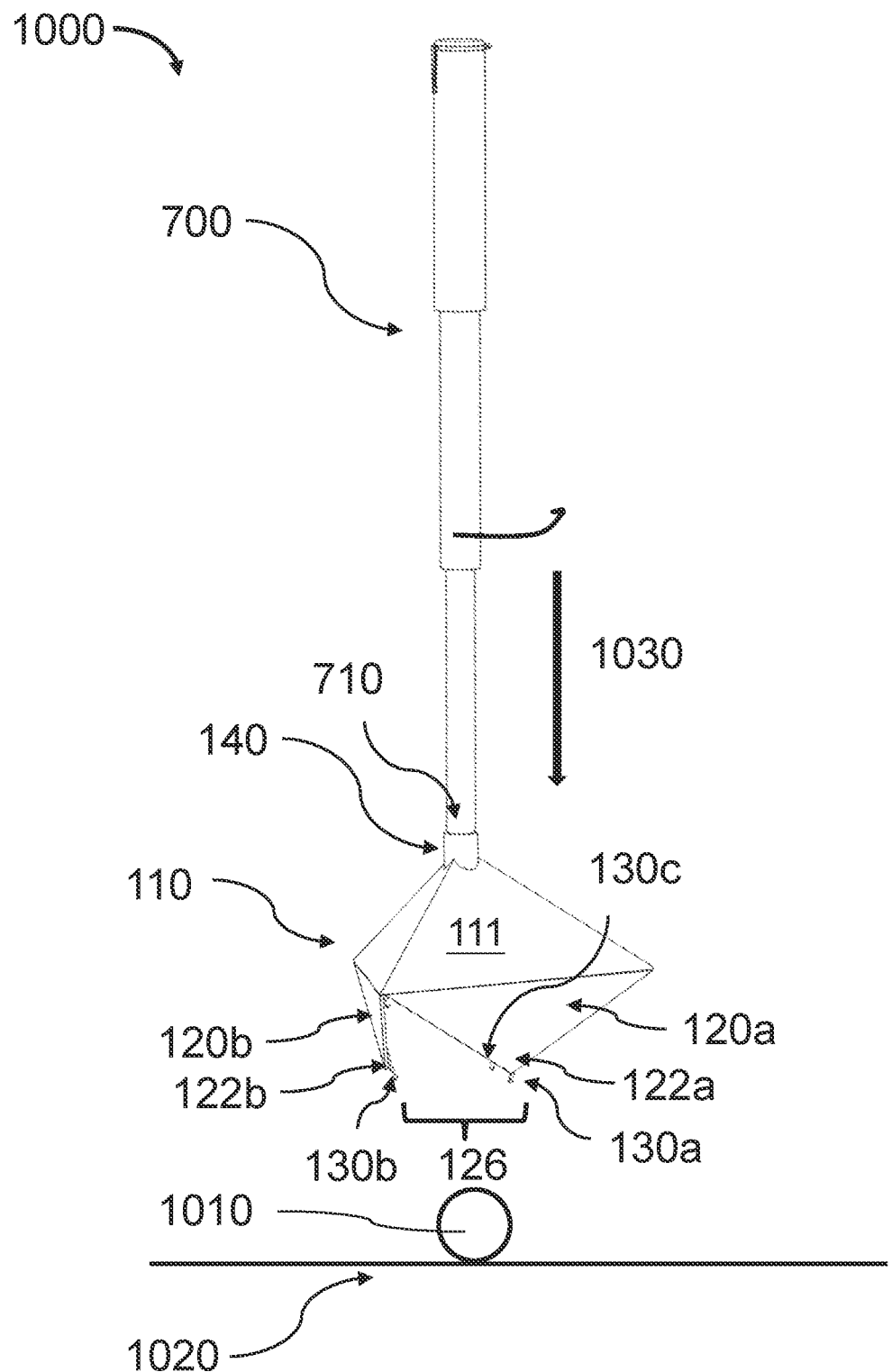
FIG. 10A is a schematic view illustrating a system for collecting and storing waste according to an example embodiment when the panels are in an open state.

Referring now to FIG. 10A, which shows a system for collecting and storing waste 1000 comprising the disposable container 110 in Example 1 and the extendable handle 700 in Example 7. The disposable container 110 is connected to the extendable handle 700 by the reversible engagement of the engagement component of the handle distal end 710 (shown in FIGS. 7A and 7B) and the handle connector 140. The first, second and third panels 120*a*, 120*b* and 120*c* of the disposable container 110 are in the open state, and the panel distal end 122*a* of the first panel 120*a*, the panel distal end 122*b* of the second panel 120*b* and the panel distal end of the third panel (not shown) define the opening 126 therebetween. In some embodiments, the disposable container 110 and the extendable handle 700 together form a system for collecting and storing waste.

In some embodiments, the disposable container 110 in the system for collecting and storing waste 1000 can be replaced by/interchanged with the disposable containers as described in any other examples, including but not limited to disposable containers as described in Examples 2, 3, 4 or 5. In some embodiments, the extendable handle 700 in the system for collecting and storing waste 1000 can be replaced by/interchanged with the extendable handle as described in any other examples, including but not limited to the extendable handle 700' as described in Example 8.

How the Devices and Systems Works

Figures 10B, 10C:
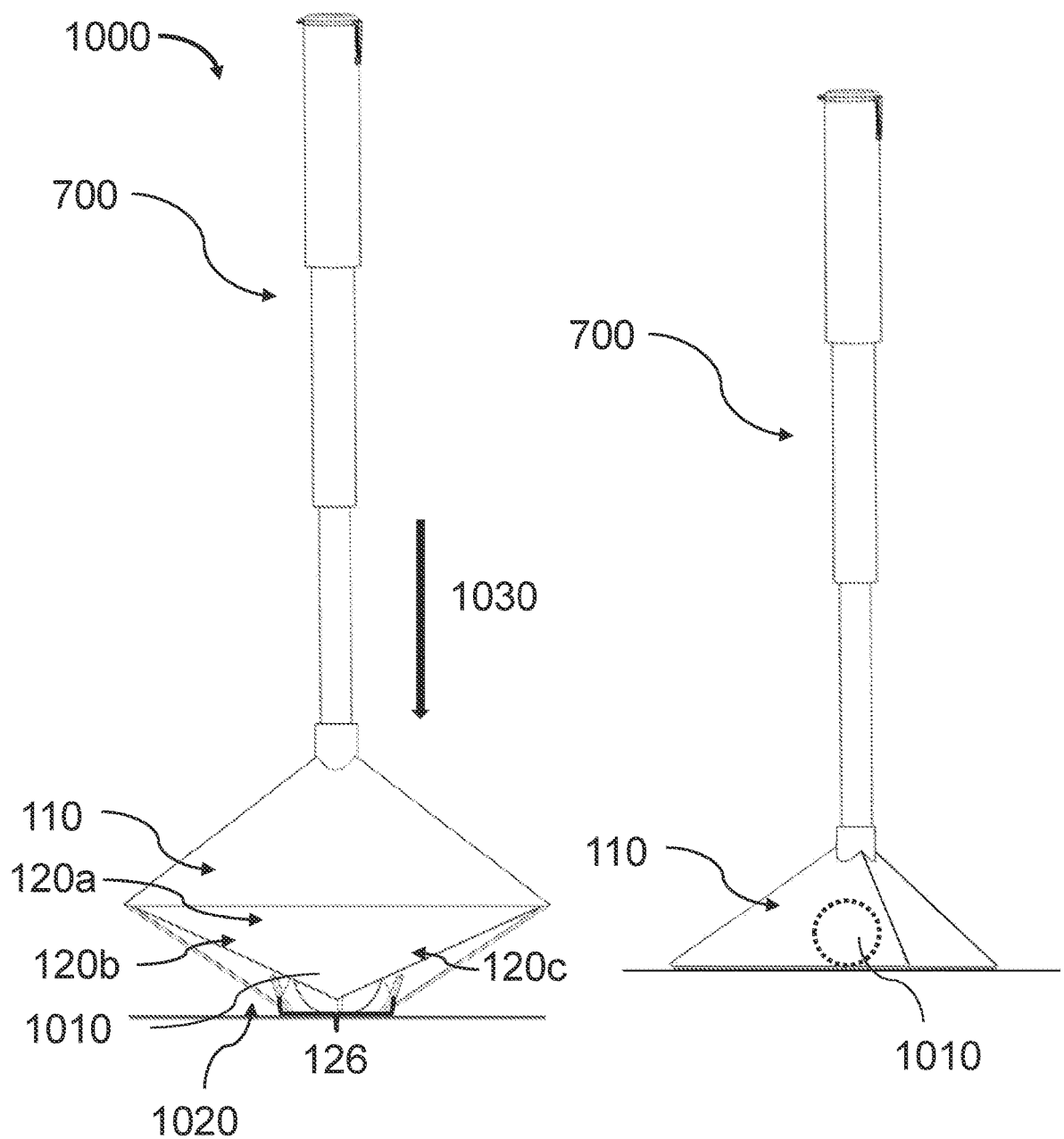
FIGS. 10B and 10C are schematic views illustrating the intermediate and final states respectively when a downward force is applied on the system of FIG. 10A against a target surface to scoop up a waste.

Now turning to the operation of the system for collecting and storing waste 1000 described above by referring to FIG. 10A to 10C. FIG. 10A shows a target surface 1020 and a piece of waste 1010 (represented as a ball shape in FIG. 10A) positioned on the target surface 1020. In some embodiments, the waste 1010 may be a solid waste from animals, e.g., animal droppings. Referring now to FIG. 10A. During use, the disposable container 110 connected to the extendable handle 700 is positioned juxtapose to the waste 1010 with the opening 126 facing the waste 1010. The first panel 120*a*, second panel 120*b* and third panel (not shown) of the disposable container 110 are initially in an open state. When a force 1030 (with a direction as shown in the arrow) is applied on the disposable container 110 to the panel distal ends of the panels against the target surface 1020, because the panels (in the open state) taper inwardly, the downward force 1030 acting on the panels causes the panel distal ends move inwards towards each other (as shown in FIG. 10B) and in turn close up the opening 126 to form a closed state (as shown in FIG. 10C). Referring to FIG. 10A to 10C, the disposable container 110 and the panels together create a cavity, such that the waste 1010 can be scooped up from the target surface 1020 by the panels and accommodated within the cavity, and the locking mechanism locks the panels in the closed state to store the waste 1010 (represented as a ball shape with dotted line in FIG. 10C) within the cavity. In this embodiment, the locking mechanism includes the interlocking pins 130*a*, 130*b* and 130*c* disposed on the first panel 120*a*, the second panel 120*b* and the third panel (not shown), and the interlocking pins irreversibly interlock with each other when the panels are in the closed state to prevent the panels from opening. Optionally, the locking mechanism may further include one or more snap fit arrangements (slots and ribs) as described in Example 1 (FIG. 1C) to additionally secure the engagement of each panel with the base. Such configuration allows the waste 1010 to be scooped up, collected and stored in the system 1000, making it convenient for the users to carry and store the waste 1010 within the device until a designated waste collection site is available. In this embodiment, the force 1030 is applied via pushing the extendable handle 700 towards the direction of the disposable container 110. In another embodiment, the force 1030 may be applied directly on the disposable container 110.

Example 11

Figure 11:
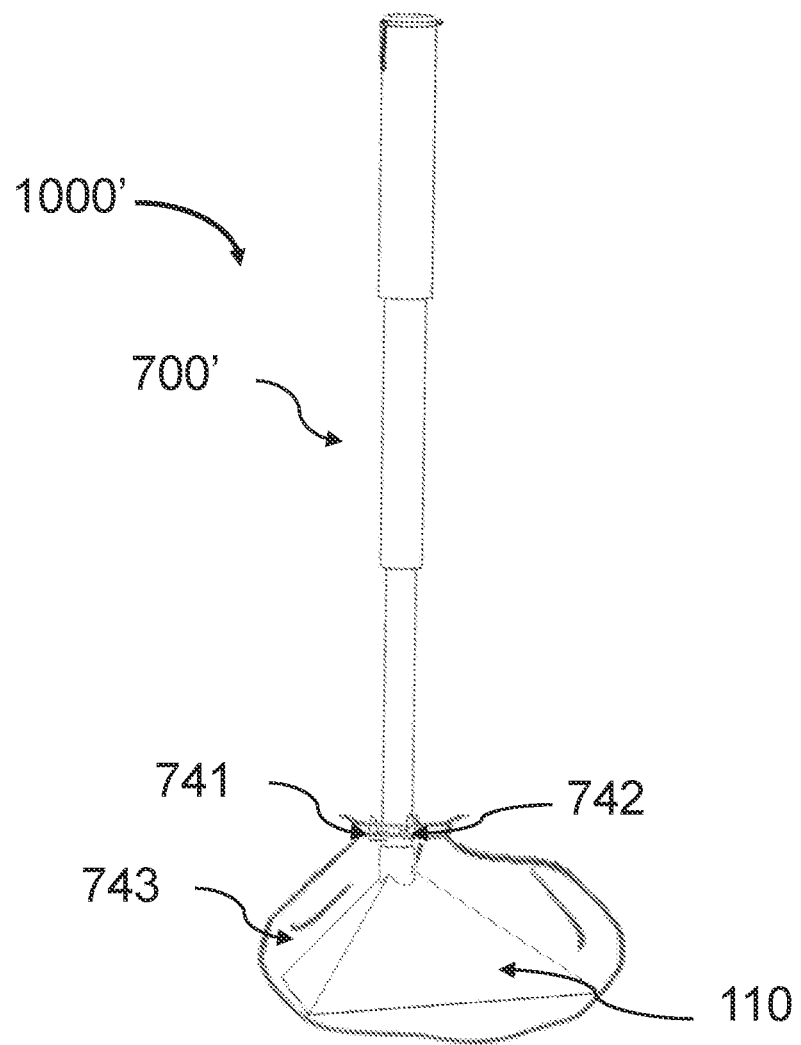
FIG. 11 is a schematic view illustrating a system for collecting and storing waste according to another example embodiment.

FIG. 11 shows a system for collecting and storing waste 1000' comprising the disposable container 110 in Example 1 and the extendable handle 700' as described in Example 8. The disposable container 110 is connected to the extendable handle 700'. In this embodiment, the panels of the disposable container 110 is in the closed state. A wrap 743, which is a plastic bag in this example embodiment, may be optionally provided to enclose the disposable container 110. The hooks 741 and 742 (and optionally other additional hooks that may be present but not shown in FIG. 11) are adapted for holding the wrap 743 such that the wrap 743 enclosing the disposable container 110 can be secured on the extendable handle 700'. Such configuration provides additional shield or protection to the device 1000' so as to prevent a waste collected and stored in the disposable container 110 from leaking out.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the shape of the body is described as pyramid or frusto-pyramid or prism shapes etc. above, but other shapes and sizes may be used, such as octagonal, spherical in shape.

For example, the shape of the chamber is described as oval shape above, but other shapes and sizes may be used, such as rectangle or, round in shape.

For example, the structure of the adaptor is described as in FIGS. 6A and 6B above, but other shapes and sizes may be used, as long as it is configured to reversibly engage with the specific sizes and shapes of the waste collection and storage device and the wearable.

For example, the rim may extend from the base edges with different thickness, as long as the thickness of the rim on each base edge is sufficient to accommodate the corresponding slot disposed thereon. In some embodiments, the rim may extend from some but not all of the base edges. In some other embodiments, the base may not contain the rim at all.

For example, the structure of the slot is described as in FIG. 1C above, but other shapes and sizes may be used, as long it can securely engage with the specific shapes and sizes of the corresponding rib when the panels are in the closed state.

For example, the panels in FIG. 1C are engaged with the rim 1124 of the base 112, thereby closing up the interior space 113 of the body 111 to create the cavity when the panels 120*a*, 120*b* and 120*c* are in the closed state, but the panels may close up without directly contacting or engaging with the base 112 of the disposable container in the closed state, and the space between the disposable container and the panels may form the cavity. In a further example, the device may have no base opening and no interior space within the body, but instead the panels may form a cavity therein even when the panels are in the closed state, so that the waste is collected and stored in the cavity formed between the disposable container and the panels when the panels are in the closed state.

For example, the handle connector may comprise one or more radially extended outer lugs adapted for interacting with an engagement component of a handle. The engagement component of the handle may have an inner circumference sized slightly larger than outer circumference of the handle connector such that the handle connector can fit within the interior of the engagement component when they are engaged with each other.

What is claimed is:

1. A waste collection and storage device, comprising:
   (a) a disposable container with a body and a base;
   (b) a plurality of panels extended from the base, each of the panels has a panel distal end extending away from the body, the panel distal ends of the panels pointing inwardly and defining an opening therebetween in an open state; and
   (c) at least one locking mechanism disposed on at least one of the panels;
      wherein when a force is applied on the container to the panel distal ends against a target surface having a waste, the panel distal ends move inwards towards each other and in turn close up the opening to form a closed state, and the container and the panels together create a cavity, such that the waste can be scooped up from the target surface and accommodated within the cavity, and wherein the locking mechanism locks the panels in the closed state to store the waste within the cavity,
   wherein the locking mechanism comprises a plurality of interlocking pins, wherein each interlocking pin comprises an attachment portion disposed on at least one of the panels and a locking portion adapted to interact with another interlocking pin of at least one adjacent panel, such that when the panels are in the closed state, the interlocking pins irreversibly interlock with each other to prevent the panels from opening.

2. The waste collection and storage device of claim 1, wherein the attachment portion is attached to the panel distal end of at least one of the panels, and the locking portion extends away from the panel distal end and bends inwardly when the panels are in the open state.

3. The waste collection and storage device of claim 1, wherein the base further comprises a rim and at least one slot disposed on the rim, and wherein each panel comprises a panel inner surface for engaging with the rim and the locking mechanism further comprises at least one rib projecting from the panel inner surface with a shape complementary to the at least one slot, such that when the panels are in the closed state, the mating of the at least one slot and the at least one rib secures the engagement of each panel with the rim.

4. The waste collection and storage device of claim 1, wherein the body has a generally frusto-pyramidal shape and the base has a generally equilateral triangle shape with three base edges, and the device comprises three panels, each panel having a general shape of a triangle with a side attached to and aligned along one of the three base edges, wherein when the panels are in the closed state, the panels abut each other to form a substantially contiguous surface sufficient to cover the base.

5. The waste collection and storage device of claim 1, further comprising a handle having a handle distal end and an engagement component disposed on the handle distal end, and wherein the disposable container further comprises a handle connector that is configured to reversibly engage with the engagement component of the handle.

6. The waste collection and storage device of claim 5, wherein the handle connector and the engagement component are engaged by a bayonet mount mechanism.

7. The waste collection and storage device of claim 5, further comprising a bottle removably engaged with the handle.

8. The waste collection and storage device of claim 5, wherein the handle further comprises at least one hook positioned proximate to the handle distal end for holding a wrap adapted to enclose the disposable container.

9. The waste collection and storage device of claim 1, wherein the disposable container is configured to reversibly engage with an adaptor comprising:
   a shaft with a shaft proximal end and an opposing shaft distal end;
   a container engaging member disposed on the shaft distal end for engaging the disposable container; and
   an animal wearable connector disposed on the shaft proximal end for reversible connection with an animal wearable;
   such that the disposable container can be reversibly connected to the animal wearable by the adaptor.

10. The waste collection device and storage of claim 1, wherein the disposable container further comprises a chamber adapted to receive a wipe.

11. A system for collecting and storing waste, comprising:
    (a) a disposable container comprising:
       (i) a body and a base;
       (ii) a plurality of panels extended from the base, each of the panels has a panel distal end extending away from the body, the panel distal ends of the panels pointing inwardly and defining an opening therebetween in an open state;
       (iii) at least one locking mechanism disposed on at least one of the panels; and
       (iv) a handle connector;
    (b) a handle having a handle distal end and an engagement component disposed on the handle distal end, wherein the engagement component is configured to reversibly engage with the handle connector;
    wherein the handle and the disposable container is connected during use, and when a force is applied on the body to the panel distal ends against a target surface having a waste, the panel distal ends move inwards towards each other and in turn close up the opening to form a closed state, and the body and the panels together create a cavity, such that the waste can be scooped up from the target surface and accommodated within the cavity, wherein the locking mechanism locks the panels in the closed state to store the waste within the cavity,
    wherein the locking mechanism comprises a plurality of interlocking pins, wherein each interlocking pin comprises an attachment portion disposed on at least one of the panels and a locking portion adapted to interact with another interlocking pin of at least one adjacent panel, such that when the panels are in the closed state, the interlocking pins irreversibly interlock with each other to prevent the panels from opening.

12. The system of claim 11, wherein the attachment portion is attached to the panel distal end of at least one of the panels, and the locking portion extends away from the distal end and bends inwardly when the panels are in the open state.

13. The system of claim 11, wherein the base further comprises a rim and at least one slot disposed on the rim, and wherein each panel comprises a panel inner surface for engaging with the rim and the locking mechanism further comprises at least one rib projecting from the panel inner surface with a shape complementary to the at least one slot, such that when the panels are in the closed state, the mating of the at least one slot and the at least one rib secures the engagement of each panel with the rim.

14. The system of claim 11, wherein the handle connector and the engagement component are engaged by a bayonet mount mechanism.

15. The system of claim 11, wherein the handle further comprises at least one hook positioned proximate to the handle distal end for holding a wrap adapted to enclose the disposable container.

16. The system of claim 11, further comprising an adaptor configured to reversibly engage with the disposable container, wherein the adaptor comprises:
   a shaft with a shaft proximal end and an opposing shaft distal end;
   a container engaging member disposed on the shaft distal end for engaging the disposable container; and
   an animal wearable connector disposed on the shaft proximal end for reversible connection with an animal wearable;
   such that the disposable container can be reversibly connected to the animal wearable by the adaptor.

\* \* \* \* \*